(12) United States Patent
Welle

(10) Patent No.: US 8,245,731 B2
(45) Date of Patent: *Aug. 21, 2012

(54) MICROFLUIDIC DEVICES WITH SEPARABLE ACTUATION AND FLUID-BEARING MODULES

(75) Inventor: Richard P. Welle, Huntington Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/839,339

(22) Filed: Jul. 19, 2010

(65) Prior Publication Data

US 2011/0100495 A1 May 5, 2011

Related U.S. Application Data

(63) Continuation of application No. 10/877,691, filed on Jun. 24, 2004, now Pat. No. 7,757,717, which is a continuation-in-part of application No. 10/843,515, filed on May 10, 2004, now Pat. No. 7,694,694.

(51) Int. Cl.
F15C 1/04 (2006.01)
(52) U.S. Cl. ........................................ 137/828; 137/271
(58) Field of Classification Search .................. 137/827, 137/828, 833, 269, 270, 271, 831; 435/287.1, 435/287.2
See application file for complete search history.

(56) References Cited

U.S. PATENT DOCUMENTS

| | | | |
|---|---|---|---|
| 2,910,836 A | 11/1959 | Karrer | |
| 2,928,253 A | 3/1960 | Lopp et al. | |
| 3,111,813 A | 11/1963 | Blumentritt | |
| 3,197,342 A | 7/1965 | Neild, Jr. | |
| 3,212,272 A | 10/1965 | Sommers | |
| 3,397,860 A | 8/1968 | Bushmeyer | |
| 3,779,814 A | 12/1973 | Miles et al. | |
| 4,476,685 A | 10/1984 | Aid | |
| 4,920,264 A | 4/1990 | Becker | |
| 4,938,258 A | 7/1990 | Sato | |
| 4,989,626 A | 2/1991 | Takagi et al. | |
| 5,101,848 A | 4/1992 | Kojima et al. | |
| 5,249,929 A | 10/1993 | Miller, Jr. et al. | |
| 5,603,351 A | 2/1997 | Cherukuri et al. | |
| 5,662,143 A | 9/1997 | Caughran | |
| 5,699,157 A | 12/1997 | Parce | |
| 5,795,788 A | 8/1998 | Bevan et al. | |
| 5,849,208 A | 12/1998 | Hayes et al. | |
| 5,975,856 A | 11/1999 | Welle | |
| 5,988,197 A | 11/1999 | Colin et al. | |
| 5,993,634 A | 11/1999 | Simpson et al. | |
| 6,007,302 A | 12/1999 | Welle | |
| 6,086,740 A | 7/2000 | Kennedy | |

(Continued)

OTHER PUBLICATIONS

Ozaki, "Pumping mechanism using periodic phase changes of a fluid," Micro Electro Mechanical Systems, 1995, MEMS '95, Proceedings, IEEE, 31-36 (Jan. 29-Feb. 2, 1995).

(Continued)

*Primary Examiner* — Craig Schneider
(74) *Attorney, Agent, or Firm* — Jones Day; Nicola A. Pisano; Jaime D. Choi

(57) ABSTRACT

A fluid transport/containment apparatus includes a fluid-bearing module and an actuation module. The fluid-bearing module includes a substrate and fluid transport/containment elements distributed therein, with one or more of the fluid transport/containment elements having microfluidic dimensions. The actuation module is detachably secured to the fluid-bearing module such that the actuation elements are operatively interfaced with the fluid transport/containment elements.

15 Claims, 19 Drawing Sheets

U.S. PATENT DOCUMENTS

| | | | |
|---|---|---|---|
| 6,100,463 | A | 8/2000 | Ladd et al. |
| 6,120,985 | A | 9/2000 | Laugham et al. |
| 6,149,123 | A | 11/2000 | Harris et al. |
| 6,159,744 | A | 12/2000 | Bevan et al. |
| 6,282,907 | B1 | 9/2001 | Ghoshal |
| 6,283,718 | B1 | 9/2001 | Prosperetti et al. |
| 6,311,713 | B1 | 11/2001 | Kaartinen |
| 6,328,070 | B2 | 12/2001 | Clayton et al. |
| 6,344,325 | B1 | 2/2002 | Quake et al. |
| 6,349,740 | B1 | 2/2002 | Cho et al. |
| 6,382,254 | B1 | 5/2002 | Yang et al. |
| 6,387,234 | B1 | 5/2002 | Yeung et al. |
| 6,408,878 | B2 | 6/2002 | Unger et al. |
| 6,453,928 | B1 | 9/2002 | Kaplan et al. |
| 6,467,275 | B1 | 10/2002 | Ghoshal |
| 6,521,188 | B1 | 2/2003 | Webster |
| 6,536,476 | B2 | 3/2003 | Ueno et al. |
| 6,540,895 | B1 | 4/2003 | Spence et al. |
| 6,557,575 | B1 | 5/2003 | Gerhardt et al. |
| 6,561,479 | B1 | 5/2003 | Eldridge |
| 6,575,188 | B2 | 6/2003 | Parunak |
| 6,598,403 | B1 | 7/2003 | Ghoshal |
| 6,599,098 | B2 | 7/2003 | Weng et al. |
| 6,619,311 | B2 | 9/2003 | O'Connor et al. |
| 6,637,210 | B2 | 10/2003 | Bell |
| 6,658,860 | B2 | 12/2003 | McGrew |
| 6,679,279 | B1 | 1/2004 | Liu et al. |
| 6,767,706 | B2 | 7/2004 | Quake et al. |
| 6,793,753 | B2 | 9/2004 | Unger et al. |
| 6,857,449 | B1 | 2/2005 | Chow |
| 6,877,528 | B2 | 4/2005 | Gilbert et al. |
| 6,880,576 | B2 | 4/2005 | Karp et al. |
| 6,959,555 | B2 | 11/2005 | Bell |
| 6,981,522 | B2 | 1/2006 | O'Connor et al. |
| 7,008,193 | B2 | 3/2006 | Najafi et al. |
| 7,128,081 | B2 | 10/2006 | Dourdeville |
| 7,195,036 | B2 | 3/2007 | Burns et al. |
| 7,216,660 | B2 | 5/2007 | Troian et al. |
| 7,241,421 | B2 | 7/2007 | Webster et al. |
| 7,650,910 | B2 | 1/2010 | Welle |
| 7,686,040 | B2 | 3/2010 | Welle |
| 7,694,694 | B2 | 4/2010 | Welle |
| 7,721,762 | B2 | 5/2010 | Welle |
| 7,757,716 | B2 | 7/2010 | Welle |
| 2002/0007858 | A1 | 1/2002 | Xu et al. |
| 2002/0029814 | A1 | 3/2002 | Unger et al. |
| 2002/0124879 | A1 | 9/2002 | Kaplan et al. |
| 2002/0127736 | A1 | 9/2002 | Chou et al. |
| 2002/0143437 | A1 | 10/2002 | Handique et al. |
| 2002/0144738 | A1 | 10/2002 | Unger et al. |
| 2002/0145231 | A1 | 10/2002 | Quake et al. |
| 2002/0148234 | A1 | 10/2002 | Bell |
| 2002/0150683 | A1 | 10/2002 | Troian |
| 2002/0166585 | A1 | 11/2002 | O'Connor et al. |
| 2003/0008308 | A1 | 1/2003 | Enzelberger et al. |
| 2003/0019522 | A1 | 1/2003 | Parunak |
| 2003/0019833 | A1 | 1/2003 | Unger et al. |
| 2003/0061687 | A1 | 4/2003 | Hansen et al. |
| 2003/0080442 | A1 | 5/2003 | Unger |
| 2003/0089865 | A1 | 5/2003 | Eldridge |
| 2003/0096310 | A1 | 5/2003 | Hansen et al. |
| 2003/0106799 | A1 | 6/2003 | Covington et al. |
| 2003/0152463 | A1 | 8/2003 | Shuler et al. |
| 2003/0231967 | A1 | 12/2003 | Najafi et al. |
| 2004/0073175 | A1 | 4/2004 | Jacobson et al. |
| 2004/0084647 | A1 | 5/2004 | Beden et al. |
| 2004/0086871 | A1 | 5/2004 | Schembri |
| 2004/0115731 | A1 | 6/2004 | Hansen et al. |
| 2004/0179975 | A1 | 9/2004 | Cox et al. |
| 2004/0219732 | A1 | 11/2004 | Burns et al. |
| 2004/0248167 | A1 | 12/2004 | Quake et al. |
| 2005/0086830 | A1 | 4/2005 | Zukor et al. |
| 2005/0247356 | A1 | 11/2005 | Welle |
| 2005/0247357 | A1 | 11/2005 | Welle |
| 2005/0247358 | A1 | 11/2005 | Welle |
| 2005/0249607 | A1 | 11/2005 | Klee |
| 2005/0260081 | A1 | 11/2005 | Tanaka et al. |
| 2005/0284511 | A1 | 12/2005 | Welle |
| 2005/0284526 | A1 | 12/2005 | Welle |
| 2005/0284527 | A1 | 12/2005 | Welle |
| 2007/0227592 | A1 | 10/2007 | Allen et al. |
| 2008/0230490 | A1 | 9/2008 | Welle |
| 2010/0200093 | A1 | 8/2010 | Welle |
| 2010/0229986 | A1 | 9/2010 | Welle |

OTHER PUBLICATIONS

Sim et al., "A phase change type micropump with aluminum flap valves," J. Micromech. Microeng., 13 (2003) 286-294 (Published Jan. 29, 2003).

USPTO Notice of Allowance for U.S. Appl. No. 10/877,602, 4 pages (mailed Mar. 24, 2010).

USPTO Final Office Action for U.S. Appl. No. 10/877,602, 9 pages (mailed Nov. 2, 2009).

USPTO Non-Final Office Action for U.S. Appl. No. 10/877,602, 9 pages (mailed Feb. 2, 2009).

USPTO Non-Final Office Action for U.S. Appl. No. 10/877,602, 8 pages (mailed Jun. 12, 2008).

USPTO Non-Final Office Action for U.S. Appl. No. 10/877,602, 8 pages (mailed May 29, 2007).

USPTO Non-Final Office Action for U.S. Appl. No. 10/877,691, 13 pages (mailed Aug. 17, 2009).

USPTO Final Office Action for U.S. Appl. No. 10/877,691, 11 pages (mailed Feb. 26, 2009).

USPTO Non-Final Office Action for U.S. Appl. No. 10/877,691, 6 pages (mailed Sep. 15, 2008).

USPTO Non-Final Office Action for U.S. Appl. No. 10/877,691, 6 pages (mailed Mar. 13, 2008).

USPTO Supplemental Notice of Allowance for U.S. Appl. No. 11/150,551, 4 pages (mailed Oct. 26, 2009).

USPTO Notice of Allowance for U.S. Appl. No. 11/150,551, 9 pages (mailed Sep. 11, 2009).

USPTO Non-Final Office Action for U.S. Appl. No. 11/150,551, 8 pages (mailed Feb. 2, 2009).

USPTO Non-Final Office Action for U.S. Appl. No. 11/150,551, 6 pages (mailed May 14, 2008).

USPTO Notice of Allowance for U.S. Appl. No. 10/843,515, 6 pages (mailed Nov. 30, 2009).

USPTO Non-Final Office Action for U.S. Appl. No. 10/843,515, 7 pages (mailed Jun. 23, 2009).

USPTO Non-Final Office Action for U.S. Appl. No. 10/843,515, 7 pages (mailed Nov. 17, 2008).

USPTO Advisory Action for U.S. Appl. No. 10/843,515, 3 pages (mailed Jul. 14, 2008).

USPTO Final Office Action for U.S. Appl. No. 10/843,515, 8 pages (mailed Apr. 17, 2008).

USPTO Non-Final Office Action for U.S. Appl. No. 10/843,515, 6 pages (mailed Sep. 17, 2007).

USPTO Non-Final Office Action for U.S. Appl. No. 10/843,515, 5 pages (mailed Jan. 12, 2007).

USPTO Notice of Allowance for U.S. Appl. No. 11/150,558, 15 pages (mailed Nov. 19, 2009).

USPTO Non-Final Office Action for U.S. Appl. No. 11/150,558, 10 pages (mailed Mar. 19, 2009).

USPTO Advisory Action for U.S. Appl. No. 11/150,558, 3 pages (mailed Dec. 3, 2008).

USPTO Final Office Action for U.S. Appl. No. 11/150,558, 27 pages (mailed Aug. 15, 2008).

USPTO Non-Final Office Action for U.S. Appl. No. 11/150,558, 8 pages (mailed Feb. 22, 2008).

USPTO Notice of Allowance for U.S. Appl. No. 11/190,312, 7 pages (mailed Jan. 11, 2010).

USPTO Non-Final Office Action for U.S. Appl. No. 11/190,312, 14 pages (mailed Aug. 19, 2009).

USPTO Notice of Allowance for U.S. Appl. No. 10/877,602, 9 pages (mailed Mar. 24, 2010).

USPTO Final Office Action for U.S. Appl. No. 12/749,350, 12 pages (mailed Apr. 4, 2011).

USPTO Non-Final Office Action for U.S. Appl. No. 12/749,350, 12 pages (mailed Sep. 23, 2010).

USPTO Final Office Action for U.S. Appl. No. 11/690,115, 9 pages (mailed Sep. 2, 2010).

USPTO Non-Final Office Action for U.S. Appl. No. 11/690,115, 9 pages (mailed Mar. 26, 2010).

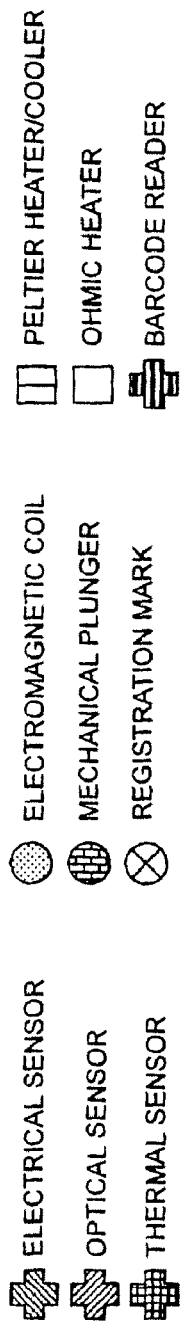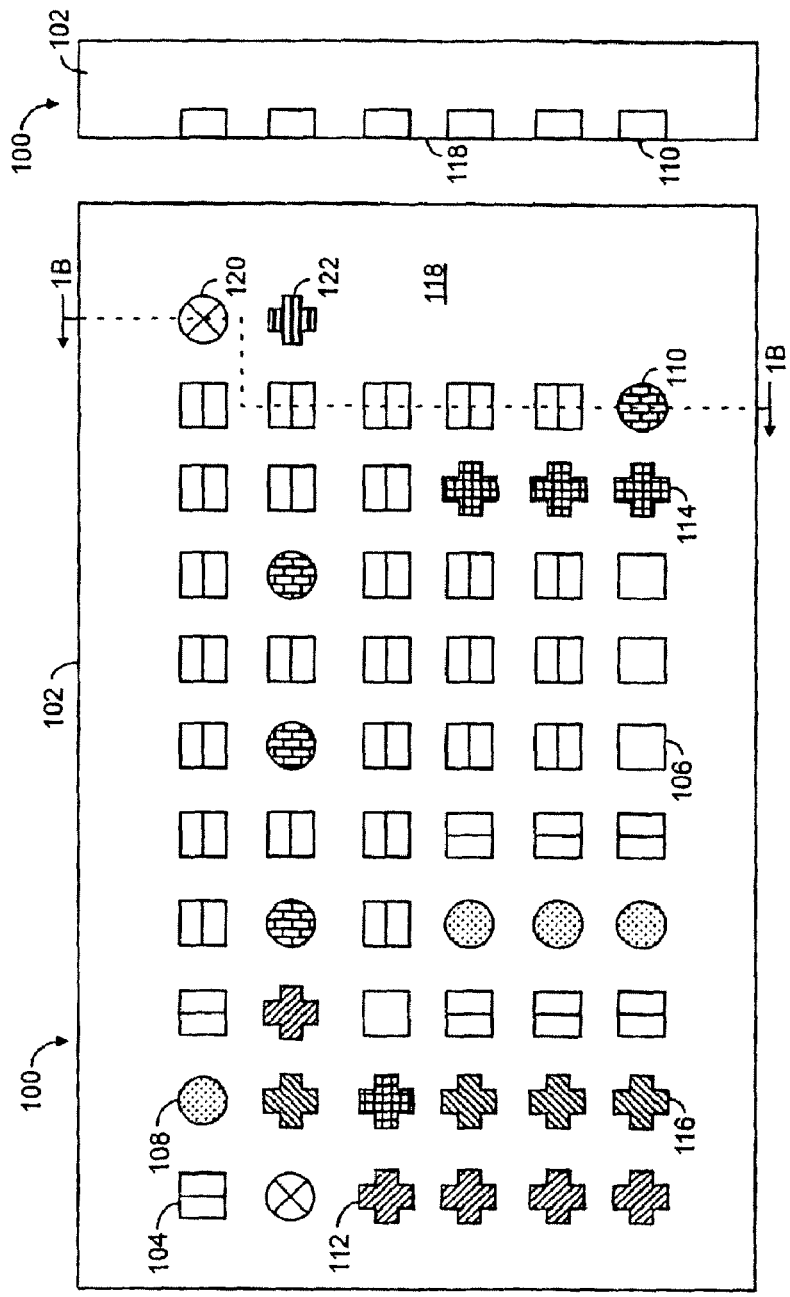
FIG. 1A
FIG. 1B

MICROFLUIDIC DEVICES WITH SEPARABLE ACTUATION AND FLUID-BEARING MODULES

CROSS-REFERENCE TO RELATED APPLICATIONS

This application is a continuation of U.S. patent application Ser. No. 10/877,691, now U.S. Pat. No. 7,757,717, filed on Jun. 24, 2004, which is a continuation-in-part of U.S. patent application Ser. No. 10/843,515, now U.S. Pat. No. 7,694,694, filed on May 10, 2004, both of which are incorporated herein by reference. This application is related to U.S. patent application Ser. No. 10/877,602, now U.S. Pat. No. 7,757,716, filed on Jun. 24, 2004, the entire contents of which are incorporated herein by reference.

TECHNICAL FIELD

The invention relates generally to devices and valves for controlling fluid flow and, in particular, to microfluidic devices and valves.

BACKGROUND ART

Developments in miniaturization and large-scale integration in fluidics have led to the concept of creating an entire chemistry or biology laboratory on a fluidic analog of the electronic microchip. Such integrated microfluidic devices (known as Micro Total Analysis Systems, or μTAS) are seen as key to automating and reducing costs in many biological analysis applications, including genetic analyses and medical diagnostics. When conducting such biological analyses, however, it is often important to avoid the possibility of cross-contamination between separate samples. For example, if the same instrument is used for analyzing a series of blood samples from separate patients, it is considered completely unacceptable for any residue from one sample to remain in the instrument where it might contaminate a later sample. This has led to the design of instruments where all components that may come into contact with the sample are removable, and are either disposed of or cleaned.

A microfluidic device should be fully capable of manipulating multiple fluids. Manipulation includes a number of functions such as storage, transport, heating, cooling, and mixing. Performing these functions requires that the microfluidic device include not only flow channels, but also at least valves, pumps, heaters, and coolers. Although all these functions have been demonstrated with varying degrees of success on microfluidic devices, valves and pumps have typically been complex devices, which are difficult to manufacture. Unfortunately, this leads to high fabrication costs, which generally make it impractical to manufacture the devices to be disposable.

Thus, a need exists for a microfluidic device that is capable of performing various manipulations on fluids while also being manufacturable in a manner suitable for the devices to be disposable.

BRIEF DESCRIPTION OF THE DRAWINGS

FIGS. 1A and 1B schematically illustrate front and side views of an example embodiment of an actuation module;

DISCLOSURE OF INVENTION

Figures 2A, 2B:
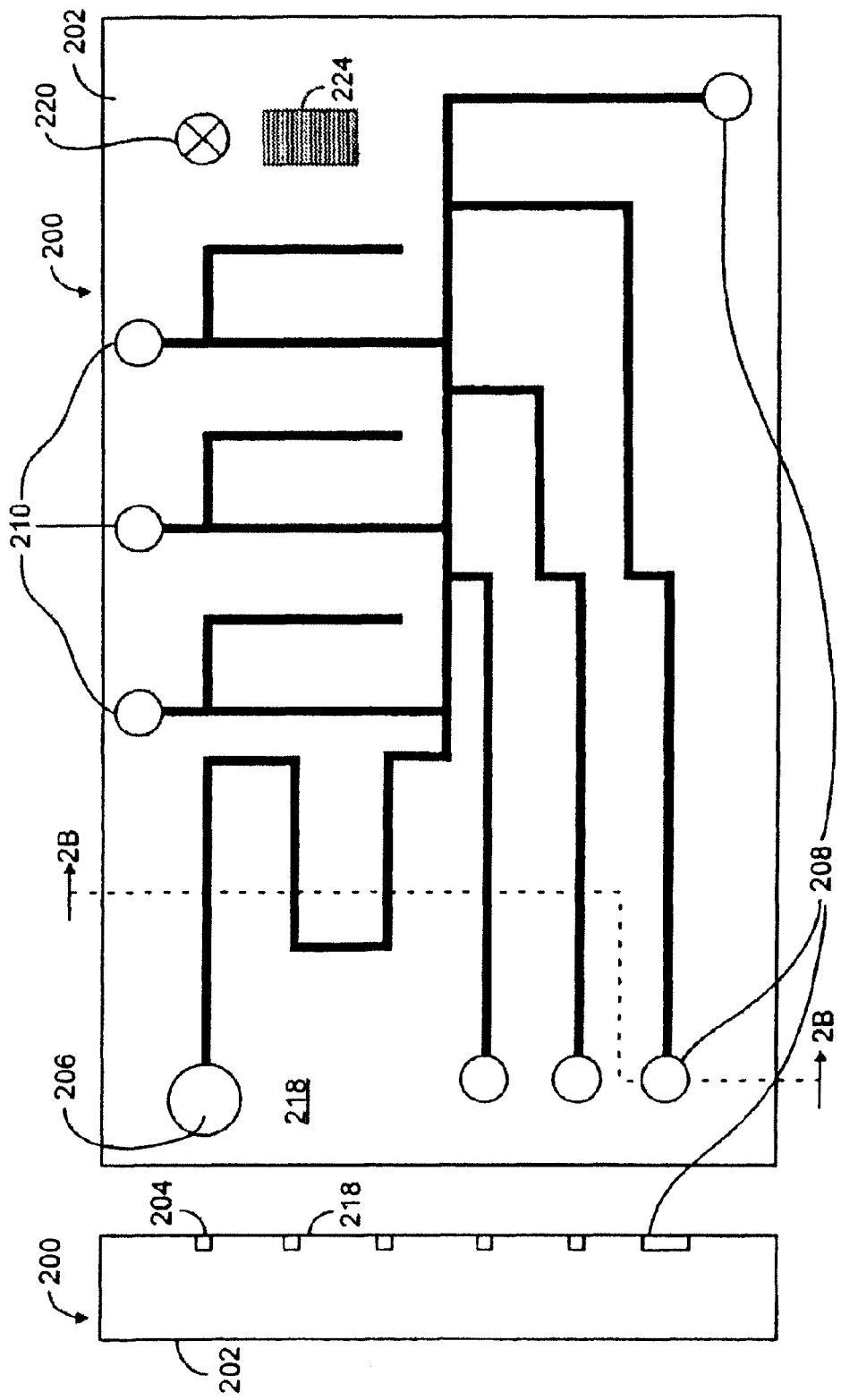
FIGS. 2A and 2B schematically illustrate front and side views of an example embodiment of a fluid-bearing module.

For purposes of this description, a "microfluidic" device or valve has one or more channels with at least one dimension less than 1 mm.

According to various embodiments of the present invention, a microfluidic device is provided by two operatively interfaced modules, namely, a fluid-bearing module and an actuator module. The fluid-bearing module incorporates fluid transport/containment elements and other elements that may come into contact with fluids. The actuator module incorporates actuation mechanisms for fluid transport and control. The two modules are brought together into contact for use. The modules are detachably secured to each other thereby allowing the fluid-bearing module, when it is no longer needed, to be separated from the actuator module and disposed of. The actuator module, on the other hand, is reusable with another fluid-bearing module, eliminating in many instances the possibility of cross-contamination between fluids in the two fluid-bearing modules.

FIGS. 1A and 1B schematically illustrate an example embodiment of an actuation module 100 incorporating actuation elements embedded within a substrate 102. Example actuation elements include, but are not limited to, Peltier heater/coolers 104, i.e., Peltier (thermoelectric) junctions for heating and cooling, resistive heaters 106, electromagnetic coils 108 for creating electric and magnetic fields, and mechanical plungers 110 for deforming a surface of a fluid-bearing module (discussed below). In this example, the actuation module 100 also includes one or more sensing elements, such optical sensors 112, thermal sensors 114, and electrical sensors 116. In this example, the actuation module 100 has a substantially flat face 118 with which the fluid-bearing module (discussed below) is operatively interfaced. In various embodiments, the actuation and sensing elements are distributed in a well-defined pattern on, or in close proximity to, the substantially flat face 118. In this illustrated example, the actuation elements are distributed in a regular array pattern. It should be appreciated, however, that the actuation elements can also be distributed in an irregular pattern.

FIGS. 2A and 2B schematically illustrate an example embodiment of a fluid-bearing module 200 incorporating fluid transport/containment elements within a substrate 202. By way of example, the substrate 202 is made from a polymeric material that is easily molded, e.g., molding flow channels using polydimethylsiloxane elastomer (PDMS). Example transport/containment elements include, but are not limited to, flow channels 204, sample inlet ports 206 and outlet ports 208, reagent reservoirs or storage cells 210, as well as other cells and elements such as mixing and reaction cells, thermal cycling cells, embedded magnets, and sensing cells. In this example, the fluid-bearing module 200 has a substantially flat face 218 with which the actuation module 100 is operatively interfaced. In various embodiments, the elements in the fluid-bearing module 200 are distributed in a well-defined pattern on, or in close proximity to, the substantially flat face 218. In this illustrated example, the transport/containment elements are distributed such that they mate or interface with their corresponding actuation element on the actuation module 100. In this example, not all actuation elements on the actuation module 100 are mated with fluid elements on the fluid-bearing module 200. Some actuation elements are surplus for the fluid-bearing module used in this example, but may be used with a fluid-bearing module having a different layout. By providing an excess of actuation elements on the actuation module, the microfluidic device can be reconfigured for a different application simply by using a fluid-bearing module with a different layout. In this example, there is also an identification element 224 (a barcode, for example) on the fluid-bearing module 200, and a reader element 122 on the actuation module 100 which allow the control system for the actuation module 100 to determine the configuration of the fluid-bearing module 200. In this example, registration markers 120 and 220 are provided on the actuation module 100 and the fluid-bearing module 200, respectively, to ensure that when the two modules are brought into contact, the various elements are in proper alignment so that the actuation and sensing elements in the actuation module 100 can act on the appropriate fluid transport and containment elements in the fluid-bearing module 200.

Figures 3A, 3B:
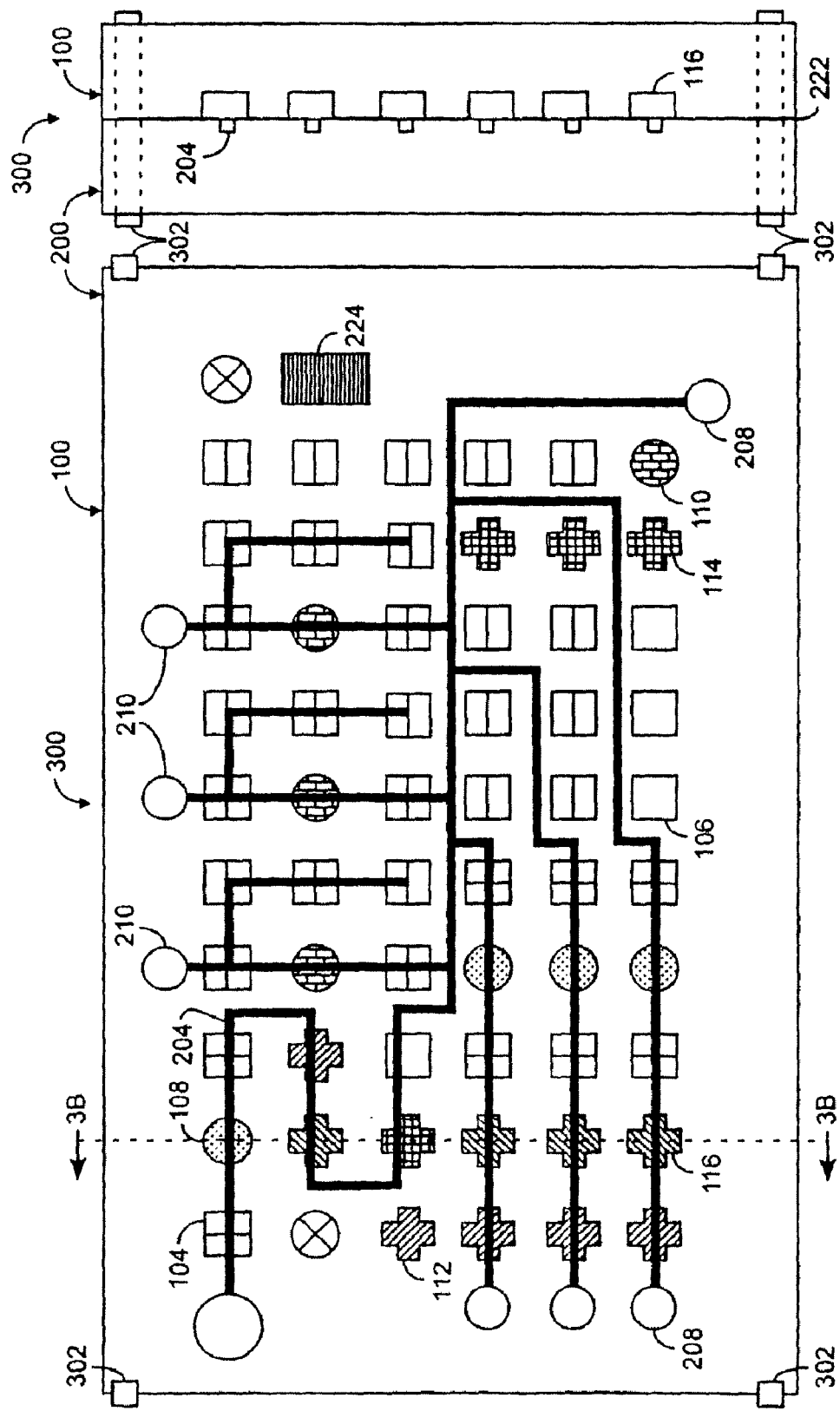
FIGS. 3A and 3B show front and side views of an example embodiment of a multi-functional microfluidic device.

FIGS. 3A and 3B show an example embodiment of a multi-functional microfluidic device 300 which includes the actuation module 100 and the fluid-bearing module 200 in their assembled configuration. In this example embodiment, the fluid-bearing module 200 also includes a cover 222 (e.g., a cover sheet) to enclose the flow channels and prevent fluids contained within the flow channels from coming into contact with the actuation module 100. Alternatively or additionally, the actuation module 100 can be coated with a protective layer (e.g., a disposable protective layer or an easily-cleaned protective layer) to facilitate restoring the cleanliness of the actuation module 100 in the event it should become contaminated with fluids.

In this example embodiment, the actuation module 100 and the fluid-bearing module 200 are detachably secured together with a clamp mechanism 302. For the multi-functional microfluidic device 300 and its components, proper operation of the components requires that the fluid-bearing module 200 be in good thermal and/or mechanical contact with the actuation module 100. In this example, the fluid-bearing module 200 is held in place on the actuation module 100 by the clamp mechanism 302. It should be noted, however, that if the fluid-bearing module 200 is fabricated using a flexible material such as PDMS, for example, it may be possible to trap small air bubbles between the two modules, which may limit thermal conduction across the interface. In an alternative configuration for assembling the two modules, the actuation module 100 is provided with a plurality of small holes in the surface 118 that mates with the fluid-bearing module 200. The holes are connected to a vacuum source (not shown). When the two modules are mated, a seal is created at the edge of the interface (with an o-ring, for example), and the vacuum source is used to remove air from the space between the two modules. The resulting vacuum ensures good thermal contact while also holding the two modules together.

In an example embodiment, a fluid transport/containment apparatus includes: a fluid-bearing module including a substrate and fluid transport/containment elements distributed therein, one or more of the fluid transport/containment elements having microfluidic dimensions; and an actuation module including actuation elements, the actuation module being detachably secured to the fluid-bearing module such that the actuation elements are operatively interfaced with the fluid transport/containment elements.

Figure 3C:
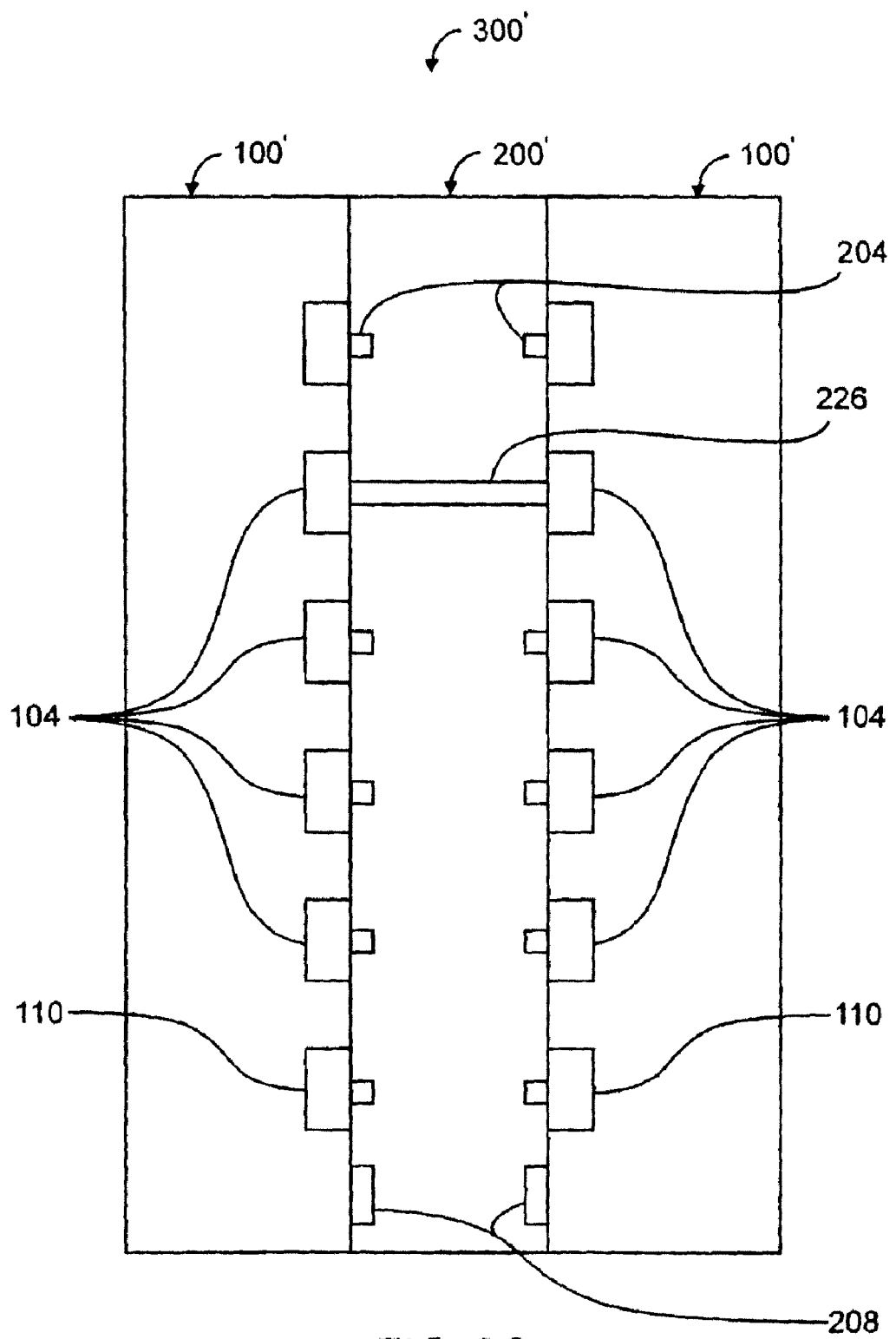
FIG. 3C shows a side view of an example embodiment of a multi-functional microfluidic device which includes two actuation modules and a fluid-bearing module.

FIG. 3C shows an example embodiment of a multi-functional microfluidic device 300' which includes two actuation modules 100' and a fluid-bearing module 200' in their assembled configuration. In this embodiment, additional functionality is provided by fabricating the fluid-bearing module 200' with fluid-bearing elements on two faces, and with at least one flow channel 226 through the module connecting the fluid-bearing elements on the two faces. This not only allows doubling of the number of fluid bearing elements in any given area, but also allows the flow channels to cross one-another without intersecting, leading to the possibility of much more complex geometries, with consequent increases in functionality. In this example embodiment, the two actuation modules 100' are configured to separately actuate the fluid-bearing elements on the two sides of the fluid-bearing module 200'.

Various components shown in the above-discussed figures are described in detail in the following sections.

Thermal Control Component

Figure 4:
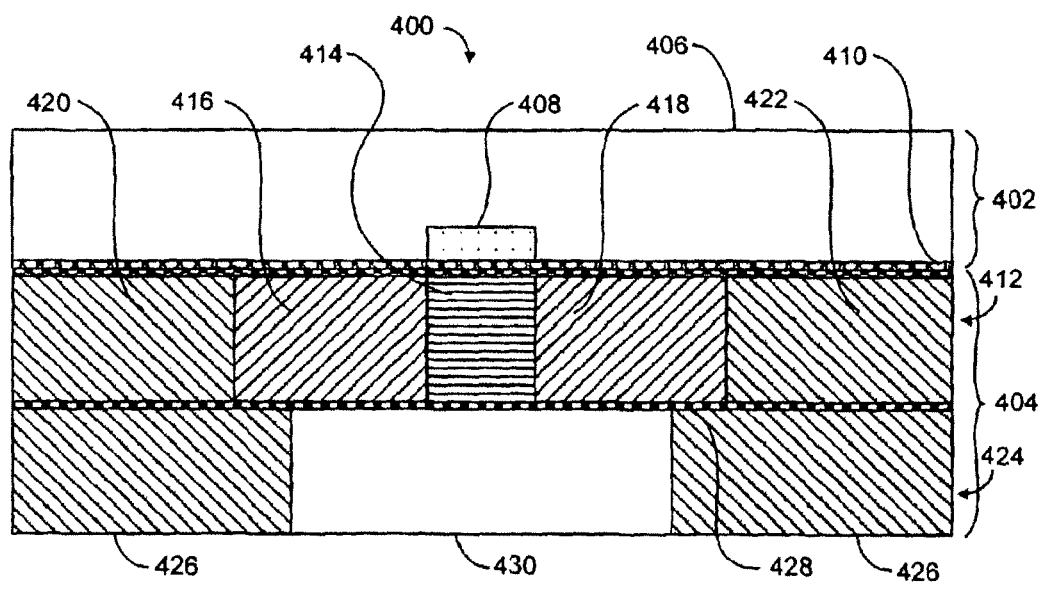
FIG. 4 is a cross-sectional side view of an example thermal control component.

FIG. 4 illustrates an example embodiment of a thermal control component 400, which includes a fluid-bearing module 402 and a thermal module 404 shown assembled. The fluid-bearing module 402 includes a substrate 406 and a thermal control volume element 408 recessed into the substrate 406. By way of example, the substrate 406 is made of a material such as polydimethylsiloxane (PDMS) with a low thermal conductivity compared to the fluid in the thermal control volume element 408. In this example, the thermal control volume element 408 is enclosed by bonding a cover layer 410 to the fluid-bearing module 402. For example, the cover layer 410 is a thin membrane of a material with a relatively high thermal conductivity (for example, 2-micron-thick stainless steel). In an example embodiment, the thermal control volume element 408 has a depth less than 25 microns. Greater depths are also possible, but may lead to longer thermal equilibration times.

The thermal module 404 includes a heating/cooling element 412 and is detachably secured to the fluid-bearing module 402 such that the heating/cooling element 412 is thermally coupled to the thermal control volume element 408. In this example embodiment, the heating/cooling element 412 is a thermoelectric (Peltier) device of a geometry designed to ensure substantially uniform heating or cooling of the thermal control volume. In this example, the Peltier device includes a layer 414 of a material of high electrical and thermal conductivity (silver, for example) sandwiched between layers 416 and 418 of n-type and p-type semiconductor thermoelectric materials (bismuth telluride (BiTe), for example). In this example, these layers are in turn sandwiched between two layers 420 and 422 of a material with high electrical and thermal conductivity (copper, for example) to provide electrical contacts to the thermoelectric material. In this example, the resulting five-layer sandwich structure is mounted on a heat sink 424 formed of a high-thermal-conductivity material 426 (such as copper, or a thermally conducting ceramic). If the heat sink material is electrically conducting, then it must also be coated with an electrically insulating material (a thin glass layer 428, for example) to prevent the heat sink from shorting the Peltier junction. If the fluid-bearing module is covered by a layer of electrically conducting material, then either the fluid-bearing module, or the thermal module, or both, must be coated with an electrically insulating layer, glass for example, to prevent a short across the Peltier junction. The heat-sink layer may also include a region 430 of low thermal conductivity adjacent to the center layer of the five-layer Peltier sandwich structure. The outer surface of the heat-sink layer is preferably maintained at a constant temperature.

Operation of the thermal control component 400 is enabled when the fluid-bearing module 402 is brought into contact and properly aligned, with the thermal module 404. As shown in FIG. 4, the thermal control volume element 408 on the fluid-bearing module 402 is adjacent to, and in good thermal contact with, the heating/cooling element 412 on the thermal module 404.

The five-layer Peltier sandwich structure controls the temperature of the thermal control volume element 408 in a substantially uniform manner as follows. An electric current is caused to flow through the sandwich in a direction from the n-type semiconductor through the silver layer to the p-type semiconductor. This will cause heat to be absorbed due to the Peltier effect at both faces of the silver layer. Since the thermal conductivity of silver is at least two orders of magnitude higher than the thermal conductivities of the materials surrounding it (including BiTe, the fluid, and the substrate of the fluid-bearing module 402), the temperature of the silver will be approximately uniform. The Peltier effect will also cause heat to be released at each of the junctions between the BiTe and the copper layers. This heat will be dissipated by thermal conduction through the copper conduction layer into the heat-sink layer. The temperature of the silver layer will thus be maintained at a uniform value lower than the temperature of the heat-sink layer. The minimum temperature that can be maintained in the silver layer is limited by thermal conduction in all adjacent layers, and by ohmic heating in the BiTe layers, but it is sufficiently low to freeze water-based fluids when the heat sink is maintained at normal room temperatures. Running the electric current in the reverse direction, from the p-type semiconductor through the silver layer to the n-type semiconductor, will produce the opposite effect. Heat will be released at the two faces of the silver layer and absorbed at the copper-BiTe interfaces. The silver layer can thus be maintained at a uniform temperature higher than the temperature of the heat sink. The maximum temperature is limited by thermal conduction in all adjacent layers (but not by ohmic heating in the BiTe which, in this case, contributes to higher temperatures), but is sufficiently high to boil water-based fluids when the heat sink is maintained at normal room temperature. The temperature of the silver layer can thus be maintained at any value within a useful range through the process of controlling the direction and magnitude of the current through the sandwich structure. Assembling the two modules together assures that there will be good thermal contact between the thermal control volume and the silver layer. As such, the temperature of the fluid in the thermal control volume will also be maintained at a uniform value within this useful range. In various embodiments, the thermal control volume element 408 has a small dimension in the direction perpendicular to the plane of interface between the two modules to ensure that thermal equilibrium is reach quickly. For example, with a thermal control volume depth of 10 microns, and a cover layer 410 made of stainless steel 2 microns thick, a water-based fluid in the thermal control volume element 408 will come into equilibrium with the heating/cooling element 412 in less than 100 Ms.

Temperature control in this system can be realized by using the Seebeck effect. In this case, the current in the system is momentarily turned off. The Seebeck effect generates a potential difference across the sandwich structure that is a function only of the temperature difference between the silver layer and the two copper conduction layers. Alternatively, the temperature difference can also be obtained, without shutting off the current, by measuring the voltage-current characteristics of the system.

In some applications where cooling below ambient temperature is not a requirement, the Peltier sandwich structure can be replaced by an ohmic heater. In various embodiments, the fluid-bearing module 402 containing the thermal control volume element 408 can be used interchangeably with a thermal module 404 containing either a Peltier sandwich structure or an ohmic heater.

In an example embodiment, a thermal control apparatus includes: a fluid-bearing module including a substrate and a thermal control volume element recessed into the substrate, the thermal control volume element having microfluidic dimensions; and a thermal module including a heating/cooling element, the thermal module being detachably secured to the fluid-bearing module such that the heating/cooling element is thermally coupled to the thermal control volume element.

Valve Component

Figure 5A:
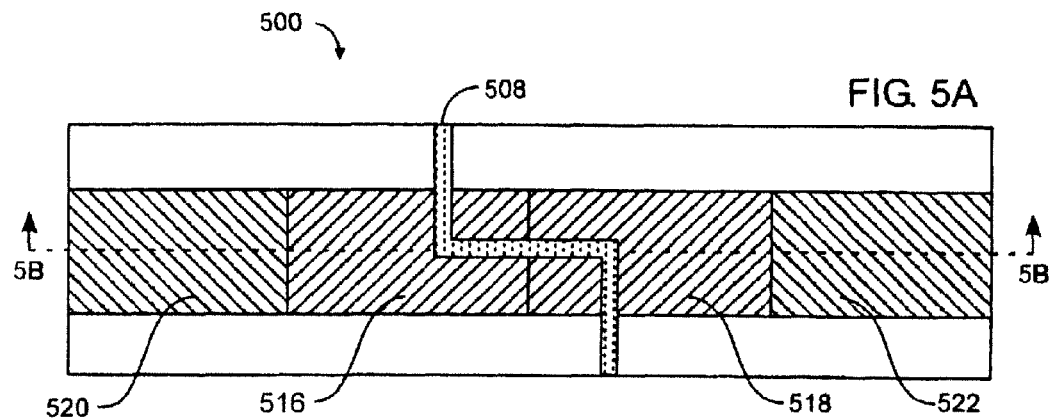
FIGS. 5A and 5B are top and cross-sectional side views of an example valve component.
Figure 5B:
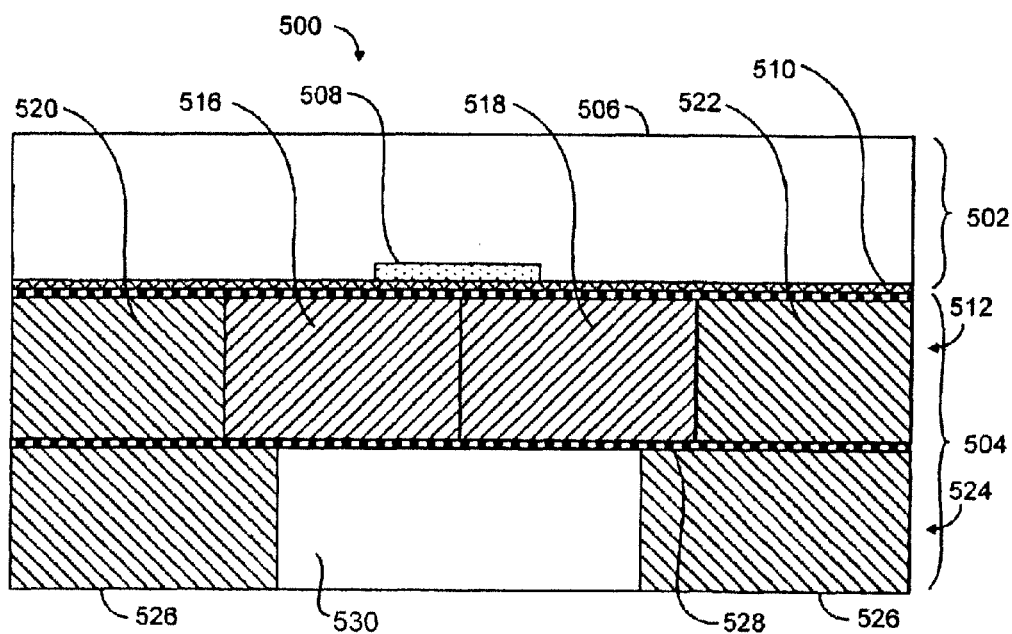

FIGS. 5A and 5B illustrate an example embodiment of a valve component 500, which includes a fluid-bearing module 502 and a thermal module 504 shown assembled. The fluid-bearing module 502 includes a substrate 506 and a flow channel element 508 recessed into the substrate 506. By way of example, the substrate 506 is made of a material such as polydimethylsiloxane (PDMS) with a low thermal conductivity compared to the fluid in the flow channel element 508. In this example, the flow channel element 508 is enclosed by bonding a cover layer 510 to the fluid-bearing module 502. For example, the cover layer 510 is a thin membrane of a material with a relatively high thermal conductivity (for example, 2-micron-thick stainless steel). In an example embodiment, the flow channel element 508 has a depth less than 25 microns. Greater depths are also possible, but may lead to longer actuation times for the valve.

The thermal module 504 includes a heating/cooling element 512 (e.g., embedded on a surface of a substrate) and is detachably secured to the fluid-bearing module 502 such that the heating/cooling element 512 is thermally coupled to the flow channel element 508. In this example embodiment, the heating/cooling element 512 is a thermoelectric (Peltier) device of a geometry designed to ensure rapid heating or cooling of the flow channel. The Peltier device can be in the five-layer configuration described above with reference to FIG. 4 or, alternatively, since there is no need to maintain a uniform temperature over an extended area, the silver layer may be eliminated, leaving the four-layer sandwich structure illustrated in FIGS. 5A and 5B. By way of example, this four-layer configuration includes layers 516 and 518 of n-type and p-type semiconductor thermoelectric materials (bismuth telluride (BiTe), for example), which are in turn sandwiched between two layers 520 and 522 of a material with high electrical and thermal conductivity (copper, for example) to provide electrical contacts to the thermoelectric material. In this example, the four-layer sandwich structure is mounted on a heat sink 524 formed of a high-thermal-conductivity material 526 (such as copper, or a thermally conducting ceramic). If the heat sink material is electrically conducting, then it must also be coated with an electrically insulating material (a thin glass layer 528, for example) to prevent the heat sink from shorting the Peltier junction. If the fluid-bearing module is covered by a layer of electrically conducting material, then either the fluid-bearing module, or the actuation module, or both, must be coated with an electrically insulating layer, glass for example, to prevent a short across the Peltier junction. The heat-sink layer may also include a region 530 of low thermal conductivity adjacent to the center layer of the four-layer Peltier sandwich structure. The outer surface of the heat-sink layer is preferably maintained at a constant temperature.

To operate the valve component 500, the fluid-bearing module 502 is brought into contact with the thermal module 504 such that the flow channel element 508 is in good thermal contact with the thermal actuation element. The valve is closed by using the Peltier device to cool the flow channel below the freezing point of the fluid. When the fluid freezes, the solid plug formed will block further flow in the channel. The valve is opened either by reversing the current in the Peltier device to heat the channel, thereby melting the plug, or by turning off the power to the Peltier device and letting the flow channel heat by conduction from the surrounding material. The time required to actuate the valve depends on the dimensions of the valve. By way of example, a valve for a water-based fluid with a flow channel depth of 10 microns, and a stainless steel cover layer of 2 microns thickness, can be closed or opened in less than 10 ms.

Thus, in an example embodiment, a thermal control apparatus includes: a fluid-bearing module including a substrate and a flow channel recessed into the substrate, the flow channel having microfluidic dimensions; and a thermal module including a Peltier device, the thermal module being detachably secured to the fluid-bearing module such that the Peltier device is thermally coupled to the flow channel.

In another example embodiment, a valve apparatus includes: a fluid-bearing module including a substrate, and a flow channel formed in the substrate, the flow channel having microfluidic dimensions; and an actuation module detachably secured to the fluid-bearing module, the actuation module including a Peltier device adjacent to the flow channel, the Peltier device being controllable to change a phase of a material in the flow channel, thereby providing a phase-change valve.

Pump Component

Figure 6A:
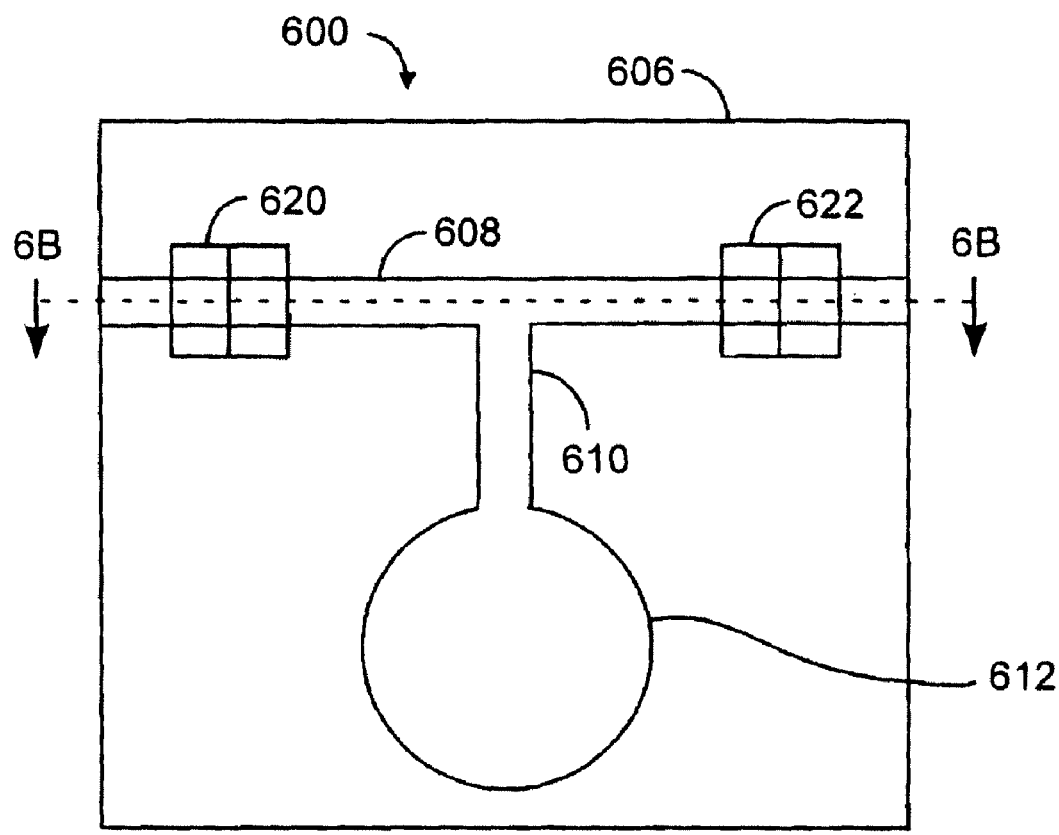
FIGS. 6A and 6B are front and side views of an example pump component.
Figure 6B:
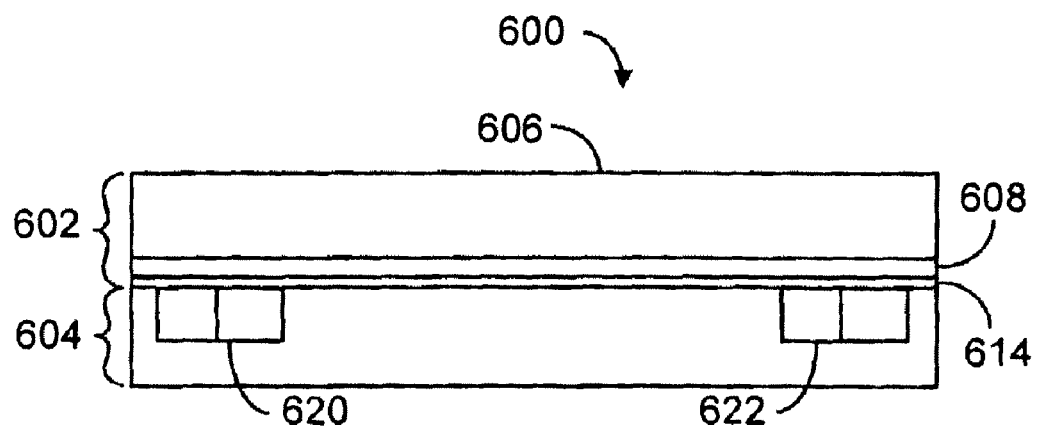

FIGS. 6A and 6B illustrate an example embodiment of a pump component 600 which includes a fluid-bearing module 602 and an actuation module 604 shown assembled; as described above, the modules 602 and 604 are detachably secured to each other. The fluid-bearing module 602 includes a substrate 606. A main flow channel 608, a control channel 610, and a variable volume cell 612 are recessed into the substrate 606 as shown. A cover layer 614 is bonded over the substrate 606. The actuation module 604 includes two valves 620 and 622, e.g., Peltier-actuated valves as described above, and a mechanism (not shown in this figure) for varying a volume of the variable volume cell 612 which is connected to the main flow channel 608 between the two valves 620 and 622. In this example, the variable-volume cell is shown connected to the main flow channel by a control channel. It should be appreciated that the variable-volume cell could also be in line with the main flow channel such that a separate control channel is unnecessary. It is also possible to effect pumping action by increasing and decreasing the volume of the main flow channel itself.

In an example embodiment, a pump apparatus includes: a fluid-bearing module including a main flow channel and a variable volume cell that meet at a junction, at least one of the main flow channel and/or the variable volume cell having microfluidic dimensions; and an actuation module detachably secured to the fluid-bearing module, the actuation module including two valves positioned adjacent to the main flow channel at opposite sides of the junction, the two valves being selectively controllable to open or close the main flow channel at the opposite sides of the junction, the actuation module including a mechanism for changing a volume of the variable volume cell such that, in conjunction with selectively controlling the two valves, a pump is provided.

Various mechanisms can be used to effect the volume change while maintaining the ability to separate the fluid-containing module from the actuation module.

Electromechanical Actuation Mechanism

Figure 7A:
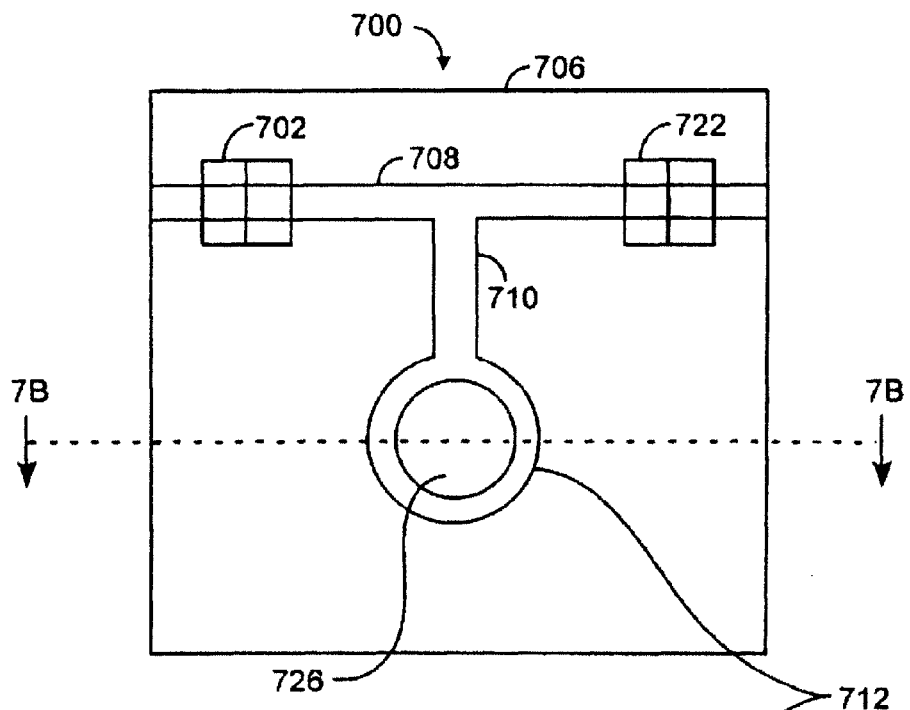
FIGS. 7A and 7B are front and side views of an example pump component including an electromechanical actuation mechanism.
Figure 7B:
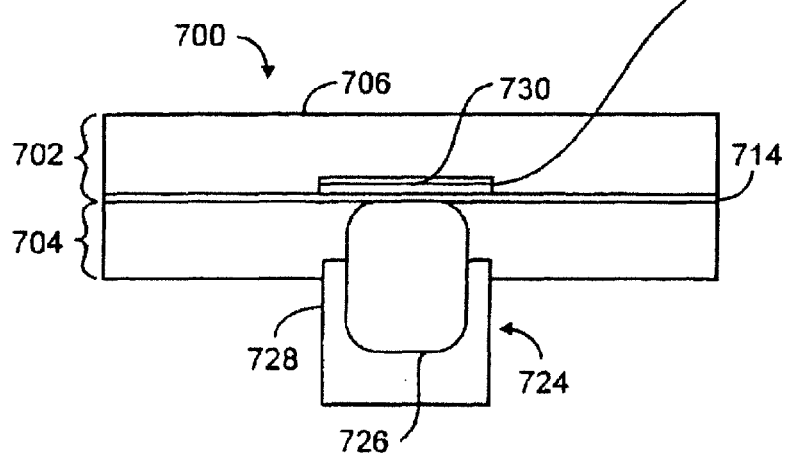

FIGS. 7A and 7B illustrate an example embodiment of a pump component 700 which includes a fluid-bearing module 702 and an actuation module 704 shown assembled; as described above, the modules 702 and 704 are detachably secured to each other. The fluid-bearing module 702 includes a substrate 706. A main flow channel 708, a control channel 710, and a variable volume cell 712 are recessed into the substrate 706 as shown. A cover layer 714 is bonded over the substrate 706. The actuation module 704 includes two valves 720 and 722 (not shown in FIG. 7B for clarity), e.g., Peltier-actuated valves as described above, and an electromechanical actuation mechanism 724 for varying the volume of the variable volume cell 712 which is connected to the main flow channel 708 between the two valves 720 and 722. In this example, the electromechanical actuation mechanism 724 includes a plunger member 726 and a drive mechanism 728. The fluid-bearing module 702 includes a flexible membrane 730 positioned adjacent to the electromechanical actuation mechanism 724 as shown. By way of example, the flexible membrane 730 is spring loaded such that if deformed it will tend to return to the relaxed position. In an example embodiment, the actuation module 704 contains a movable plunger configured so that when the two modules are assembled, and the plunger is extended, it will deform the flexible membrane over the variable-volume cell, thereby decreasing its volume. When the plunger is retracted, the spring load on the flexible membrane will force it to return to its relaxed position, thereby restoring the original volume of the cell. By way of example, starting with the plunger retracted, the inlet valve closed, and the outlet valve open, pumping action is accomplished through the following sequence of steps:

1. Extend the plunger.
2. Close the outlet valve.
3. Open the inlet valve.
4. Retract the plunger.
5. Close the inlet valve.
6. Open the outlet valve.

After step 6, the pump has been restored to its original configuration, and this sequence of steps can be repeated as often as necessary to pump the desired volume of fluid. For clarity, the variable volume cell 712 is shown as separated from the main flow channel 708 and connected by the control channel 710. The variable volume cell 712 can also be built directly in line with the main flow channel 708. In certain applications, it may be advantageous to use the main flow channel 708 itself as the "variable volume cell". In each case, the plunger member 726 on the actuation module 704 can be positioned, sized, and shaped appropriately for the location, size, and shape of the variable volume cell 712 on the fluid-bearing module 702. It should also be recognized that this pump is symmetric and can pump fluid in either direction by selecting which of the two valves is considered the inlet and which the outlet valve.

Electromagnetic Actuation Mechanism

Figures 8A, 8B:
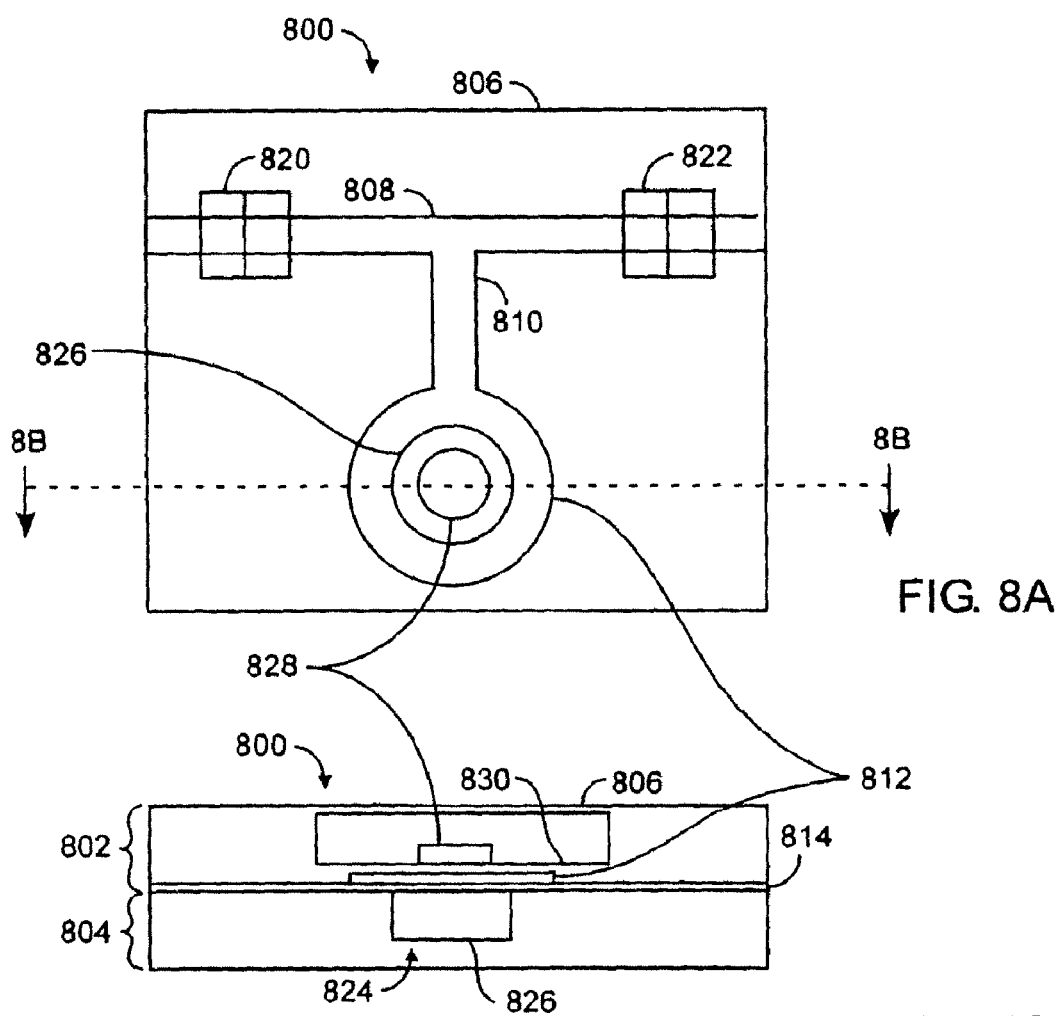
FIGS. 8A and 8B are front and side views of an example pump component including an electromagnetic actuation mechanism.

FIGS. 8A and 8B illustrate an example embodiment of a pump component 800 which includes a fluid-bearing module 802 and an actuation module 804 shown assembled; as described above, the modules 802 and 804 are detachably secured to each other. The fluid-bearing module 802 includes a substrate 806. A main flow channel 808, a control channel 810, and a variable volume cell 812 are recessed into the substrate 806 as shown. A cover layer 814 is bonded over the substrate 806. The actuation module 804 includes two valves 820 and 822 (not shown in FIG. 8B for clarity), e.g., Peltier-actuated valves as described above, and an electromagnetic actuation mechanism 824 for varying the volume of the variable volume cell 812 which is connected to the main flow channel 808 between the two valves 820 and 822. In this example, the electromagnetic actuation mechanism 824 includes an electromagnetic coil 826 and thereby avoids any potential issues that may be caused by having a moving component on the actuation module 804. In this example embodiment, the fluid-bearing module 802 includes a permanent magnet 828 embedded in the substrate 806 adjacent to the variable volume cell 812. In this embodiment, the fluid-bearing module 802 includes a flexible membrane 830 separating the permanent magnet 828 from the variable volume cell 812 such that the fluid does not come into contact with the magnet, but such that movement of the magnet toward or away from the actuation module 804 will cause the volume of the variable volume cell 812 to decrease or increase respectively. In this example embodiment, when the fluid-bearing module 802 is brought into contact with the actuation module 804, the Peltier heaters/coolers 820 and 822 are used to open and close the inlet and outlet valves, while the electromagnetic element (the electromagnetic coil 826) in the actuation module 804 is used alternately to push and pull the permanent magnet 828 in the fluid-bearing module 802 so as to alternately increase and decrease the volume of the variable volume cell 812. By way of example, starting with the electromagnet off, the inlet valve closed, and the outlet valve open, pumping action is accomplished through the following sequence of steps:

1. Attract the permanent magnet.
2. Close the outlet valve.
3. Open the inlet valve.
4. Repel the permanent magnet.
5. Close the inlet valve.
6. Open the outlet valve.

This sequence of steps can be repeated as often as necessary to pump the desired volume of fluid. As described above with reference to FIGS. 7A and 7B, the variable volume cell 812 can be either in line with the main flow channel 808, or connected to it by the control channel 810. It should also be recognized that this pump is symmetric and can pump fluid in either direction by selecting which of the two valves is considered the inlet and which the outlet valve.

Thermal Actuation Mechanism

Figure 9A:
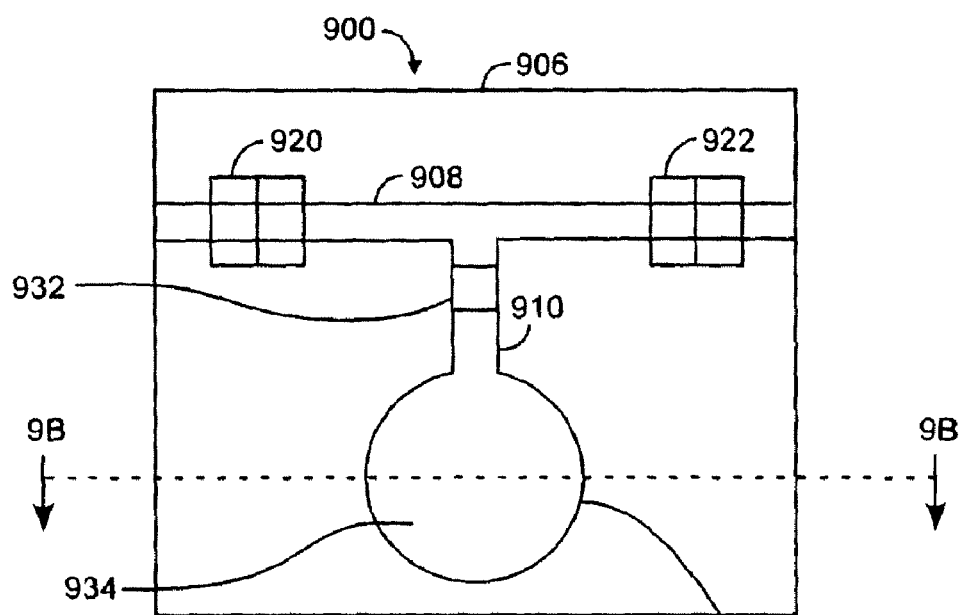
FIGS. 9A and 9B are front and side views of an example pump component including a thermal actuation mechanism.
Figure 9B:
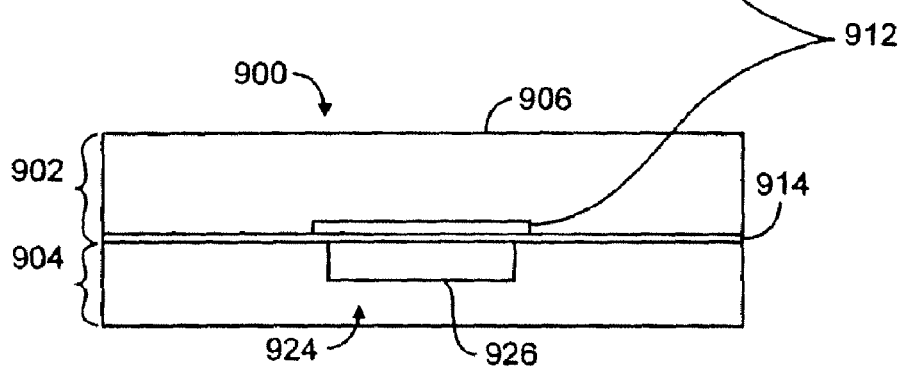

FIGS. 9A and 9B illustrate an example embodiment of a pump component 900 which includes a fluid-bearing module 902 and an actuation module 904 shown assembled; as described above, the modules 902 and 904 are detachably secured to each other. The fluid-bearing module 902 includes a substrate 906. A main flow channel 908, a control channel 910, and a variable volume cell 912 are recessed into the substrate 906 as shown. A cover layer 914 is bonded over the substrate 906. The actuation module 904 includes two valves 920 and 922 (not shown in FIG. 9B for clarity), e.g., Peltier-actuated valves as described above, and a thermal actuation mechanism 924 for varying the volume of the variable volume cell 912 which is connected to the main flow channel 908 between the two valves 920 and 922. In this example, the thermal actuation mechanism 924 includes a thermal control element 926, e.g., a Peltier heating/cooling element. In this example embodiment, a first control fluid 932 fills a portion of the control channel 910 near the intersection with the main flow channel 908. In this example, the first control fluid 932 is immiscible with the fluid being pumped. In this example, the first control fluid 932 has a very low vapor pressure so that it will not substantially evaporate over the shelf life of any device incorporating this pump. An example of a fluid satisfying these requirements is a vacuum pump oil. In this example, a second control fluid 934 partially fills the variable volume cell 912 and the control channel 910, as shown, up to the interface with the first control fluid 932. In this example, the second control fluid 934 is immiscible with the first control fluid 932. In this example, the second control fluid 934 is a liquid that will evaporate at a temperature not far above the normal ambient temperature of the valve. An example of such a fluid is water. When the second control fluid 934 is heated, some of the liquid evaporates, forcing the first control fluid 932 to move toward the main flow channel 908. This effectively decreases the volume of the main flow channel 908.

In this example embodiment, the actuation module 904 incorporates three Peltier heating/cooling elements. These elements are distributed in a pattern such that when the two modules 902 and 904 of the pump component 900 are assembled, two of the Peltier heating/cooling elements are adjacent to the main flow channel 908, one on each side of the intersection with the control channel 910. The third Peltier heating/cooling element is positioned so that it will control the temperature of the variable volume cell 912. For operation, the two modules 902 and 904 of the pump component 900 are assembled. By way of example, starting with the second control fluid 934 at room temperature, the inlet valve closed, and the outlet valve open, pumping action is accomplished through the following sequence of steps:

1. Heat and evaporate the second control fluid.
2. Close the outlet valve.
3. Open the inlet valve.

4. Cool and condense the second control fluid.
5. Close the inlet valve.
6. Open the outlet valve.

This sequence of steps can be repeated as often as necessary to pump the desired volume of fluid. It should also be recognized that this pump is symmetric and can pump fluid in either direction by selecting which of the two valves is considered the inlet and which the outlet valve.

For this pump, when it is stored for a long period of time, normal variations in the temperature of the environment may lead to evaporation of some of the second control fluid 934, resulting in the first control fluid 932 being pushed into the main flow channel 908, and possibly allowing loss of the second control fluid 934. To address this concern, the first control fluid 932 can be provided as a substance that is solid at the normal environmental temperature of the valve, but which melts at a moderate temperature. An example of such a bi-phase material is a paraffin wax. Such a configuration is discussed below.

Figure 10A:
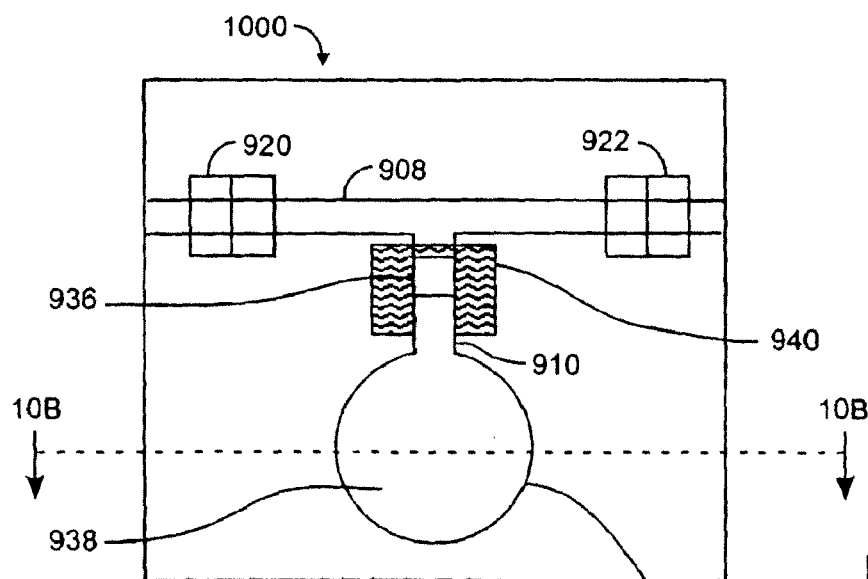
FIGS. 10A and 10B are front and side views of another example pump component including a thermal actuation mechanism.
Figure 10B:
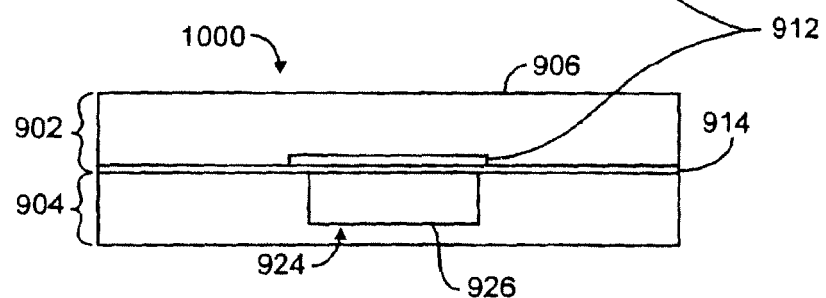

FIGS. 10A and 10B illustrate an example embodiment of a pump component 1000 which is similar to the pump component 900 (FIGS. 9A and 9B) except as now described. In this example embodiment, a first bi-phase material 936 and a second bi-phase material 938 are provided in the control channel 910 and variable volume cell 912 as shown. In this example embodiment, the actuation module 904 includes a heating element 940 positioned as shown to heat the first bi-phase material 936 to cause it to melt when the pump is being used. The pump would then cycle as above. When pumping action is completed, the first bi-phase material 936 is allowed to cool and solidify, again trapping the second bi-phase material 938 in the control channel 910. Alternatively, a second bi-phase material 938 having a relatively low vapor pressure can be used to pump the first bi-phase material 936 back and forth. For example, if the second bi-phase material 938 is a paraffin wax, it will be solid at the normal environmental temperature of the valve, and there is no risk of evaporation or loss. The valve is cycled by heating the paraffin to melting, which causes a 2-3% volume increase, followed by cooling to solidification, which reverses the volume increase. This volume change is much smaller than can be obtained using the liquid-vapor phase change, but it is more precise, and would be adequate in some applications. Also, paraffin wax can be used for both the first and second bi-phase materials 936 and 938, with no distinct boundary between them. Using water for the second bi-phase material 938 gives a greater volume change (about 9%) than with paraffin wax, but the phase change occurs at a temperature probably below the normal environmental temperature of the valve, so it would require that the thermal control element be a Peltier device. Finally, although not as efficient, a pump component can be provided using thermal expansion and contraction of the second bi-phase material 938 without involving a phase change.

In another variation, the first control fluid is replaced with a flexible diaphragm. In this configuration, the control channel is separated from the main flow channel by a flexible diaphragm such that when the diaphragm is forced to move, the volume of the main flow channel can be increased or decreased. The closed control channel is partially filled with a control fluid, such as water, that will vaporize on heating and condense on cooling. Pumping action is accomplished by the same 6-step sequence described above. Using a flexible diaphragm in place of the first control fluid provides more flexibility in the choice of the second control fluid since it is no longer necessary to avoid miscible fluids, and the possibility of loss of fluid is reduced.

Bi-Stable Valve Component

In some applications, it is useful to have a valve that will remain in either the open or closed position without application of power. According to various embodiments of the present invention, an electrically actuated bi-stable valve (e.g., microvalve) uses a phase-change control fluid to alternately block and unblock the flow of a working fluid through the valve. The control fluid is introduced from a side channel, and is pumped into or out of a main flow channel when the control fluid is in a liquid state.

Figure 11A:
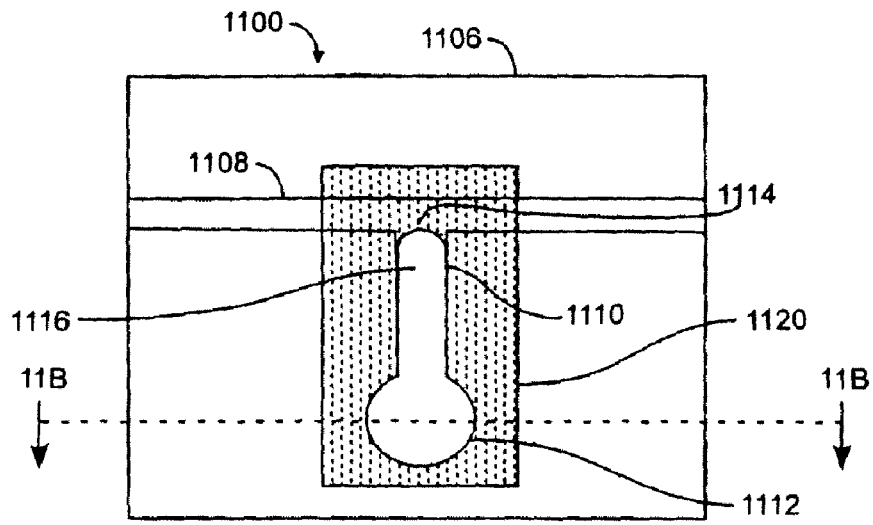
FIGS. 11A and 11B are front and side views of an example embodiment of a valve apparatus shown in its open position.
Figure 11B:
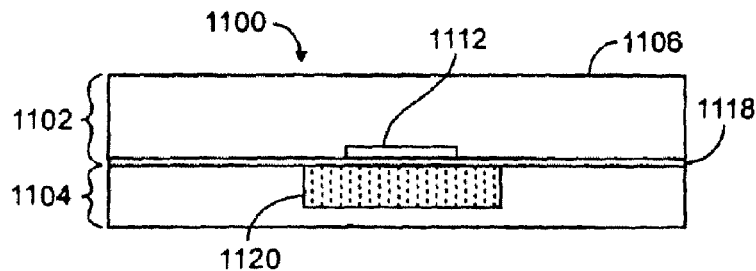

FIGS. 11A and 11B illustrate an example embodiment of a valve apparatus 1100 which includes a fluid-bearing module 1102 and an actuation module 1104 shown assembled; as described above, the modules 1102 and 1104 are detachably secured to each other. The fluid-bearing module 1102 includes a substrate 1106. In an example embodiment, the substrate 1106 is made of a material with a low thermal conductivity (PDMS, for example). A main flow channel 1108, a control channel 1110, and a reservoir 1112 are recessed into the substrate 1106 as shown. In this example embodiment, the main flow channel 1108 traverses the valve apparatus 1100 in a straight, horizontal path, and the control channel 1110 provides a path from a junction 1114 (between the main flow channel 1108 and the control channel 1110) to the reservoir 1112. In this example, the valve apparatus 1100 includes a bi-phase material 1116, which is substantially or completely contained within the reservoir 1112 and the control channel 1110 when the valve apparatus 1100 is in its open state. The bi-phase material 1116 is a substance that melts at a temperature above the normal ambient temperature of the valve apparatus 1100. A cover layer 1118 is bonded over the substrate 1106.

In this example embodiment, the actuation module 1104 includes a thermal control element 1120 positioned such that when the two modules are assembled, the thermal control element 1120 can heat the entire reservoir 1112, as well as the control channel 1110 and a portion of the main flow channel 1108 to a temperature above the melting point of the bi-phase material 1116. By way of example, the thermal control element 1120 can be a simple resistance heater, in which case the heat dissipates by conduction to the environment after the thermal control element 1120 is turned off, allowing the bi-phase material 1116 to re-solidify. Alternatively, the thermal control element 1120 can be a Peltier junction, in which case, the bi-phase material 1116 can be cooled and solidified by reversing the current and operating the Peltier junction as a cooler. In this example embodiment, the valve apparatus 1100 includes a pump mechanism (not shown in this figure) for pumping the bi-phase material 1116 into or out of the junction 1114. As described herein, various pump mechanisms including, but not limited to, plunger actuation mechanisms, electromagnetic actuation mechanisms, or thermal phase-change actuation mechanisms can be used.

Figure 12A:
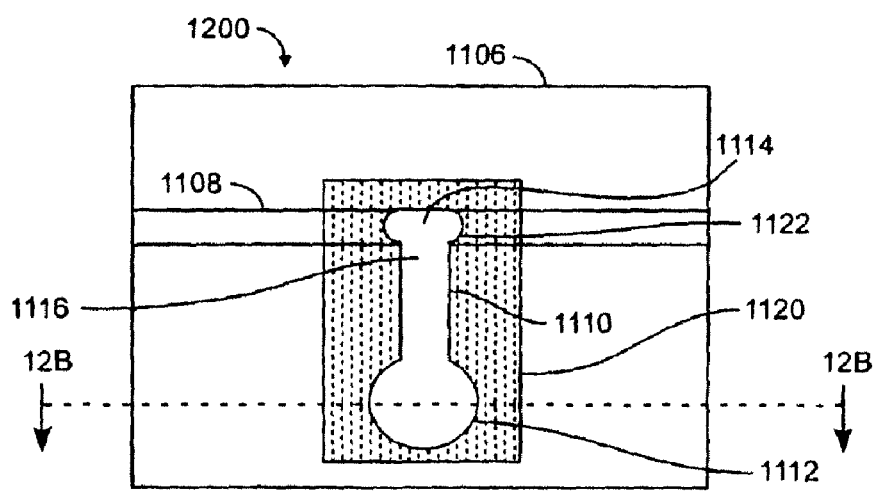
FIGS. 12A and 12B are front and side views of the valve apparatus of FIGS. 11A and 11B shown in its closed position.
Figure 12B:
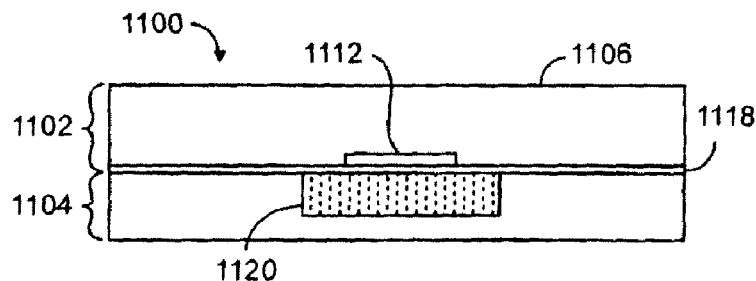

When the valve apparatus 1100 is in its open state, the bi-phase material 1116 is solid, and does not block the main flow channel 1108. In order to close the valve apparatus 1100, the entire region occupied by the bi-phase material 1116, as well as the junction 1114, is heated to a temperature above the melting point of the bi-phase material 1116. After changing phase into a "control fluid", the bi-phase material 1116 is then pumped toward the main flow channel 1108 until the bi-phase material 1116 completely fills the junction 1114 between the two channels 1108 and 1110 and possibly some additional portion of the main flow channel 1108. The thermal control element 1120 is then turned off and the bi-phase material 1116 is allowed to solidify. Referring to FIGS. 12A and 12B, flow of a working fluid (not shown) through the valve apparatus 1100 is blocked by a solid plug 1122 of the bi-phase material 1116, and the valve apparatus 1100 is thus in a closed state. In either the open or closed state, the bi-phase material 1116 is normally solid; it is heated to its melting point only for the purpose of switching the state of the valve apparatus 1100. To reopen the valve apparatus 1100, the thermal control element 1120 is again used to melt the bi-phase material 1116. Once again as a "control fluid", the bi-phase material 1116 is then pumped back into the reservoir 1112, and again allowed to cool and solidify. The valve apparatus 1100 is thus restored to the open configuration (FIGS. 11A and 11B). The valve apparatus 1100 can be repeatedly cycled with the application of power, but no power is required to maintain the valve apparatus 1100 in either the open or closed state. Provided no bi-phase material 1116 is lost during cycling, there is no fundamental limit to the number of times the valve apparatus 1100 can be cycled.

In an example embodiment, a valve apparatus includes: a fluid-bearing module including a substrate, channels formed in the substrate, at least one of the channels having microfluidic dimensions, the channels including a main flow channel and a control channel that meet at a junction, and a bi-phase material within the control channel; and an actuation module detachably secured to the fluid-bearing module, the actuation module including a heating element adjacent to the control channel and the junction, the heating element being controllable to generate sufficient energy to cause the bi-phase material to transition from a solid phase to a liquid phase, and a pumping mechanism for selectively forcing the bi-phase material either into or out of the junction when the bi-phase material is in the liquid phase, thereby providing a bi-stable, phase-change valve.

In some applications, it may be desirable to store fluids in a storage cell on a microfluidic device for an extended period until the device is needed. When the device is used, the fluids are released, for example, to act as reagents for analyzing a sample. Once the fluids have been released and used, there is no need to re-seal the storage cell. For such applications it would be useful to have a single-use bi-stable valve.

Figure 13A:
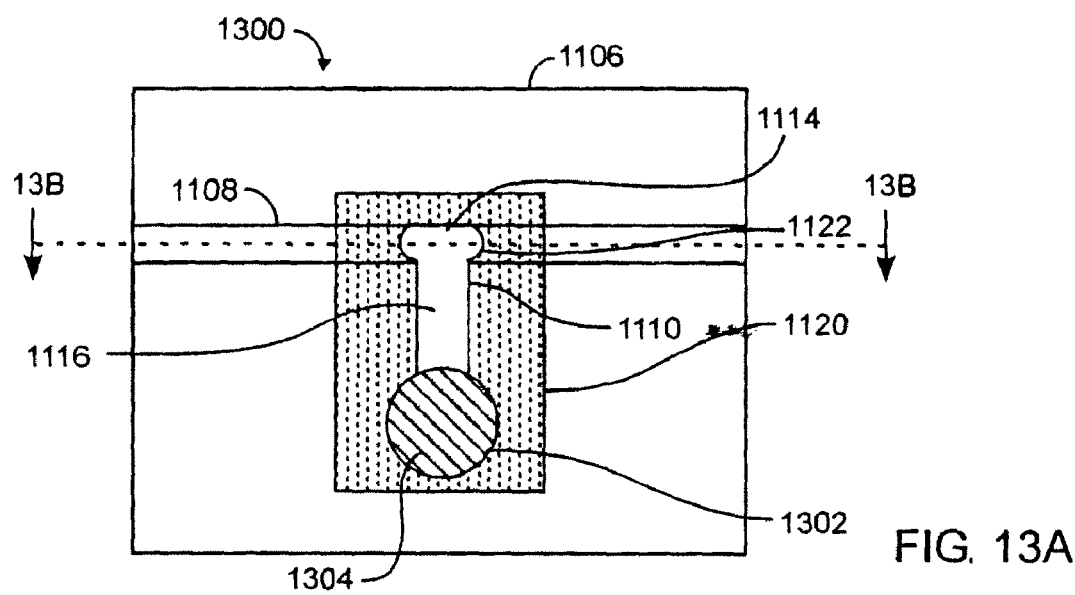
FIGS. 13A and 13B are front and side views of an example embodiment of a valve apparatus including a wicking mechanism.
Figure 13B:
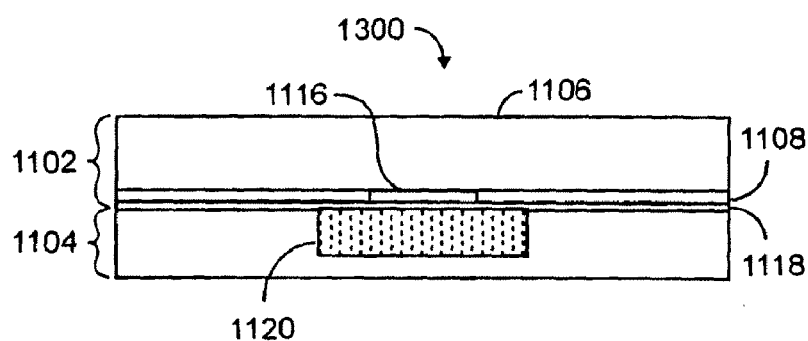

In various embodiments, valve apparatuses are configured such that they remain closed until actuated, and then switch to an open position and remain there. By way of example, such "single use" valve apparatuses can be used to seal fluids into a closed volume (e.g., storage of fluids on a microfluidic device) for long periods of time. FIGS. 13A and 13B illustrate an example embodiment of a valve apparatus 1300 which is similar to the valve apparatus 1100 (FIGS. 11A, 11B, 12A and 12B) except as now described. In this example embodiment, the fluid-bearing module 1102 includes an end volume 1302 filled with a porous material 1304 (e.g., a wick) that is easily wetted by bi-phase material 1116 in the liquid phase. In this valve, the bi-phase material 1116 is initially provided in a solidified form that blocks the junction 1114 between the main flow channel 1108 and the control channel 1110. The bi-phase material 1116, in its initial solid phase, also fills the control channel 1110 except for the end volume 1302. The fluid-bearing module 1102 mates (operatively interfaces) with the actuation module 1104 which includes the thermal control element 1120 to heat the bi-phase material 1116. The valve apparatus 1300 is actuated by heating the bi-phase material 1116. When the bi-phase material 1116 is liquefied, it is pulled by wicking action into the end volume 1302 at the end of the control channel 1110, and thereby drawn out of the main flow channel 1108. The thermal control element 1120 is then switched to cool the control fluid, which then solidifies.

The valve apparatus 1300 is open in this configuration, and working fluid is free to pass through the main flow channel 1108.

In an example embodiment, a valve apparatus includes: a fluid-bearing module including a substrate, channels formed in the substrate, at least one of the channels having microfluidic dimensions, the channels including a main flow channel and a control channel that meet at a junction, a bi-phase material within the control channel, and a mechanism for wicking the bi-phase material out of the junction when the bi-phase material is in a liquid phase; and an actuation module detachably secured to the fluid-bearing module, the actuation module including a heating element adjacent to the control channel and the junction, the heating element being controllable to generate sufficient energy to cause the bi-phase material to transition from a solid phase to the liquid phase, thereby providing a single-use, phase-change valve.

Figure 14A:
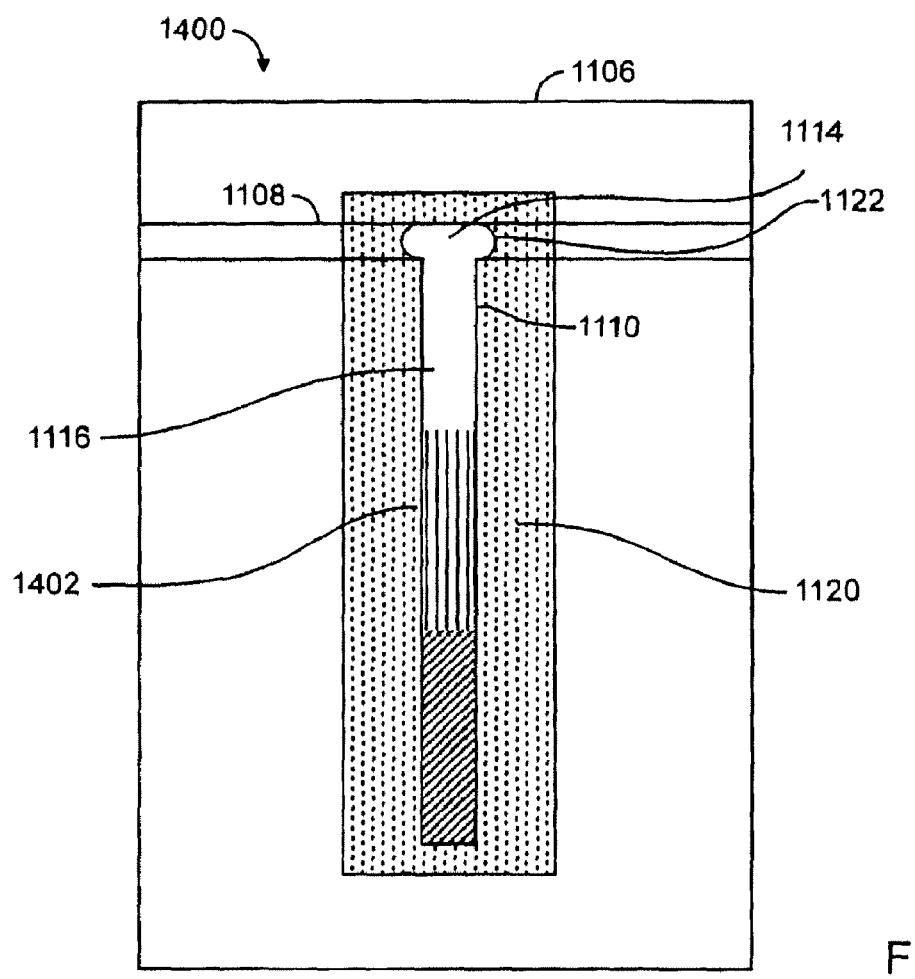
FIGS. 14A and 14B are front and side views of an example embodiment of a valve apparatus including a capillary action mechanism.
Figure 14B:
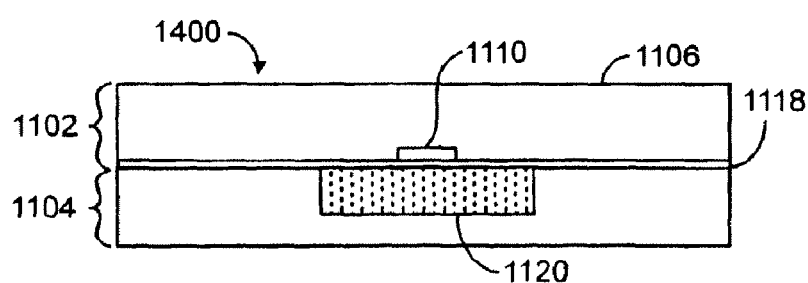
Figures 15A, 15B:
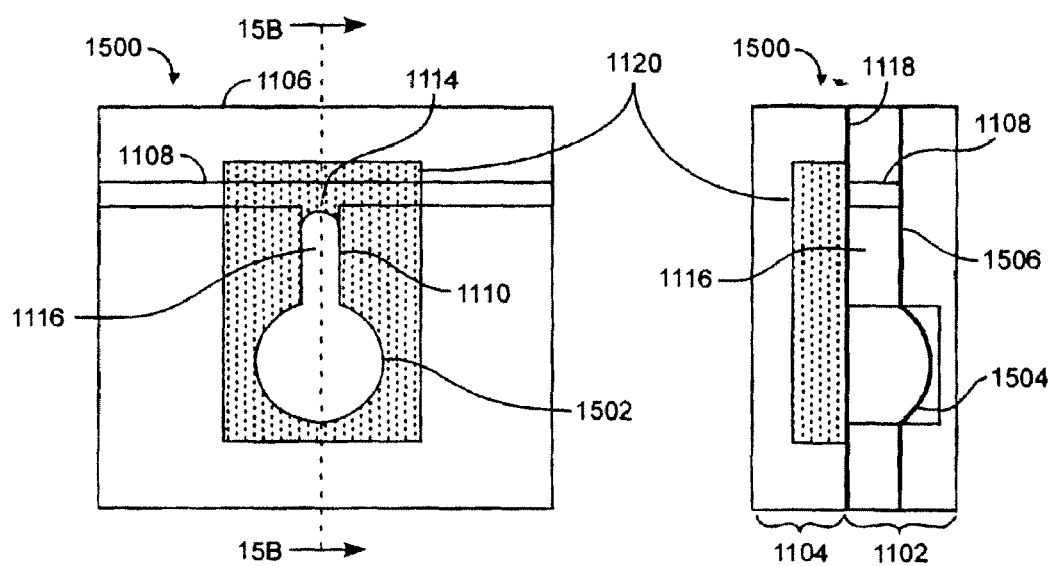
FIGS. 15A and 15B are front and side views of an example embodiment of a valve apparatus, including a pumping mechanism with a flexible diaphragm, in its open configuration.

In a variation on this valve, the porous material is replaced by a plurality of microchannels significantly smaller than the control channel. FIGS. 14A and 14B illustrate an example embodiment of a valve apparatus 1400 which is similar to the valve apparatus 1100 (FIGS. 11A, 11B, 12A and 12B) except as now described. In this example embodiment, the fluid-bearing module 1102 includes a plurality of microchannels 1402 positioned within the control channel 1110. The microchannels 1402 are initially empty of the bi-phase material 1116. When the valve apparatus 1400 is heated to melt the bi-phase material 1116, the resulting control fluid flows into the microchannels 1402 by capillary action, drawing the control fluid out of the main flow channel 1108. The thermal control element 1120 is then turned off, allowing the control fluid to solidify, leaving the valve apparatus 1400 in the open configuration.

Figures 16A, 16B:
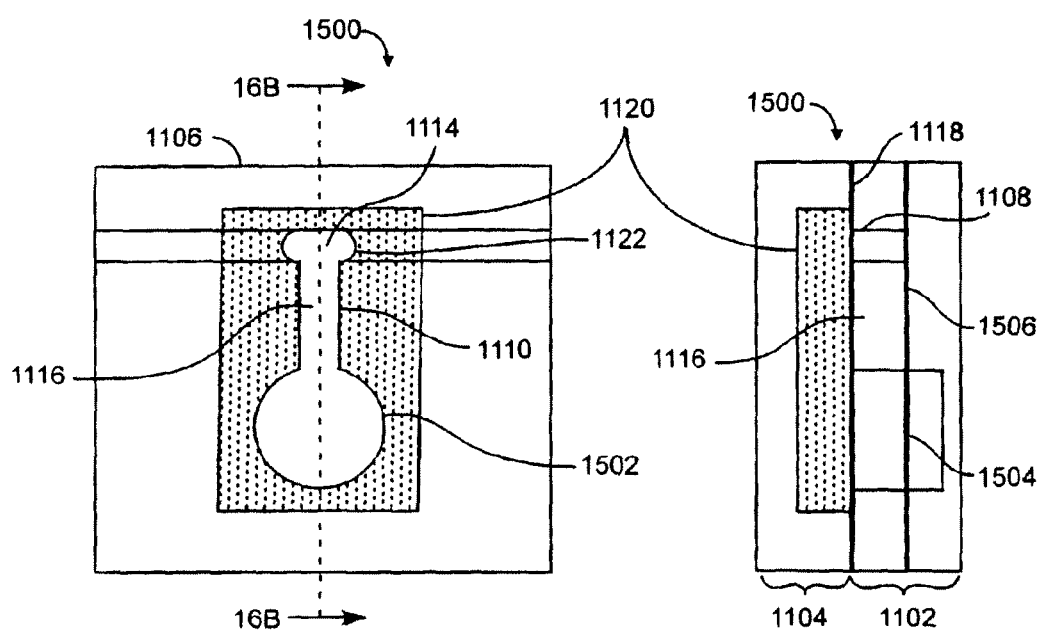
FIGS. 16A and 16B show the valve apparatus of FIGS. 15A and 15B in its closed configuration.
Figures 17A, 17B:
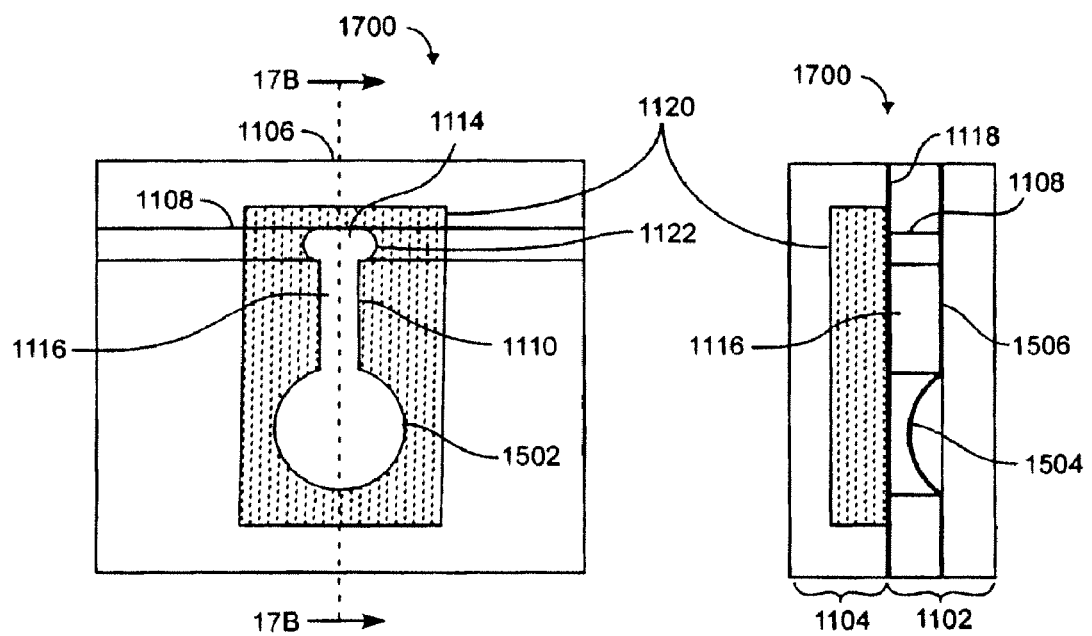
FIGS. 17A and 17B are front and side views of an example embodiment of a valve apparatus, including a pumping mechanism with a flexible diaphragm, in its closed configuration.
Figures 18A, 18B:
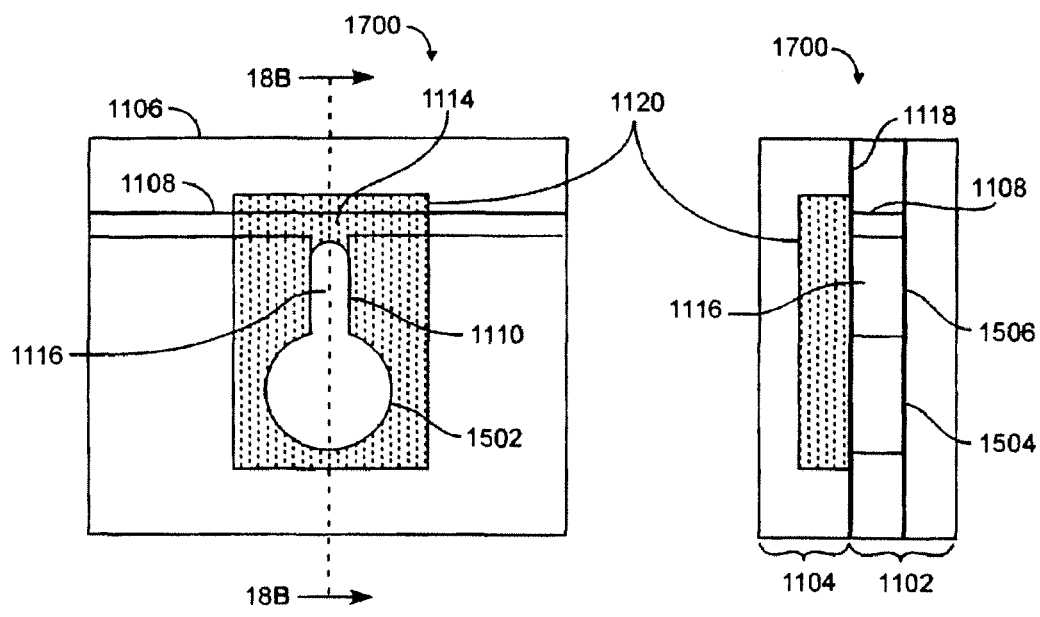
FIGS. 18A and 18B show the valve apparatus of FIGS. 17A and 17B in its open configuration.

In various embodiments, a single-use bi-stable valve apparatus is initially open. In such embodiments, application of power causes the valve apparatus to close, and it remains closed after the power is turned off. FIGS. 15A, 15B, 16A and 16B illustrate an example embodiment of a valve apparatus 1500 which is similar to the valve apparatus 1100 (FIGS. 11A, 11B, 12A and 12B) except as now described. In this example embodiment, the fluid-bearing module 1102 includes a control volume 1502, at least one side of which is closed by a flexible diaphragm 1504 (e.g., a spring-loaded metal diaphragm), and a cover layer 1506. The control channel 1110 leads to the control volume 1502 which are both filled with the bi-phase material 1116. However, the junction 1114 is not filled, and working fluid is free to flow through the valve apparatus 1500. More specifically, the control volume 1502 is filled to the point where the flexible diaphragm 1504 is pushed outward (FIGS. 15A and 15B), under stress, resulting in the control volume 1502 being larger than it would be in a relaxed state. Because the bi-phase material 1116 is solid, the flexible diaphragm 1504 is unable to move toward its relaxed state and stays in the pushed outward position. The valve apparatus 1500 is actuated by heating the control volume 1502, the control channel 1110, and the junction 1114 to a temperature above the melting point of the bi-phase material 1116. The diaphragm 1504 then relaxes, decreasing the size of the control volume 1502, and causing the fluid to flow into the junction 1114. The thermal control element 1120 is then switched to cool causing the control fluid to solidify. The valve apparatus 1500 is now stable in the closed position, as shown in FIGS. 16A and 16B, with no further requirement for application of power.

In an example embodiment, a valve apparatus includes: a fluid-bearing module including a substrate, channels formed in the substrate, at least one of the channels having microfluidic dimensions, the channels including a main flow channel and a control channel that meet at a junction, a bi-phase material within the control channel, and a flexible diaphragm adjacent to the bi-phase material, the flexible diaphragm being biased to push the bi-phase material into the junction when the bi-phase material is in a liquid phase; and an actuation module detachably secured to the fluid-bearing module, the actuation module including a heating element adjacent to the control channel and the junction, the heating element being controllable to generate sufficient energy to cause the bi-phase material to transition from a solid phase to the liquid phase, thereby providing a single-use, phase-change valve.

A similar pumping methodology can be applied to making a single-use bi-stable valve apparatus this is initially closed. FIGS. 17A, 17B, 18A and 18B illustrate an example embodiment of a valve apparatus 1700 which is similar to the valve apparatus 1500 (FIGS. 15A, 15B, 16A and 16B) except as now described. In this example embodiment, the bi-phase material 1116 initially fills the control volume 1502, the control channel 1110, and the junction 1114 such that flow of working fluid through the main flow channel 1108 is blocked. In this example embodiment, the control volume 1502 is under filled, with the diaphragm being deflected inward against a spring load. When power is applied to heat and melt the bi-phase material 1116, the diaphragm 1504 relaxes, causing the control volume 1502 to increase, and pulling the control fluid out of the main flow channel 1108. Power is then switched to cool and solidify the control fluid, leaving the valve apparatus 1700 in the configuration shown in FIGS. 18A and 18B, where the working fluid is free to flow.

In an example embodiment, a valve apparatus including: a fluid-bearing module including a substrate, channels formed in the substrate, at least one of the channels having microfluidic dimensions, the channels including a main flow channel and a control channel that meet at a junction, and a bi-phase material within the control channel, and a flexible diaphragm adjacent to the bi-phase material, the flexible diaphragm being biased to pull the bi-phase material out of the junction when the bi-phase material is in a liquid phase; and an actuation module detachably secured to the fluid-bearing module, the actuation module including a heating element adjacent to the control channel and the junction, the heating element being controllable to generate sufficient energy to cause the bi-phase material to transition from a solid phase to the liquid phase, thereby providing a single-use, phase-change valve.

Figure 19:
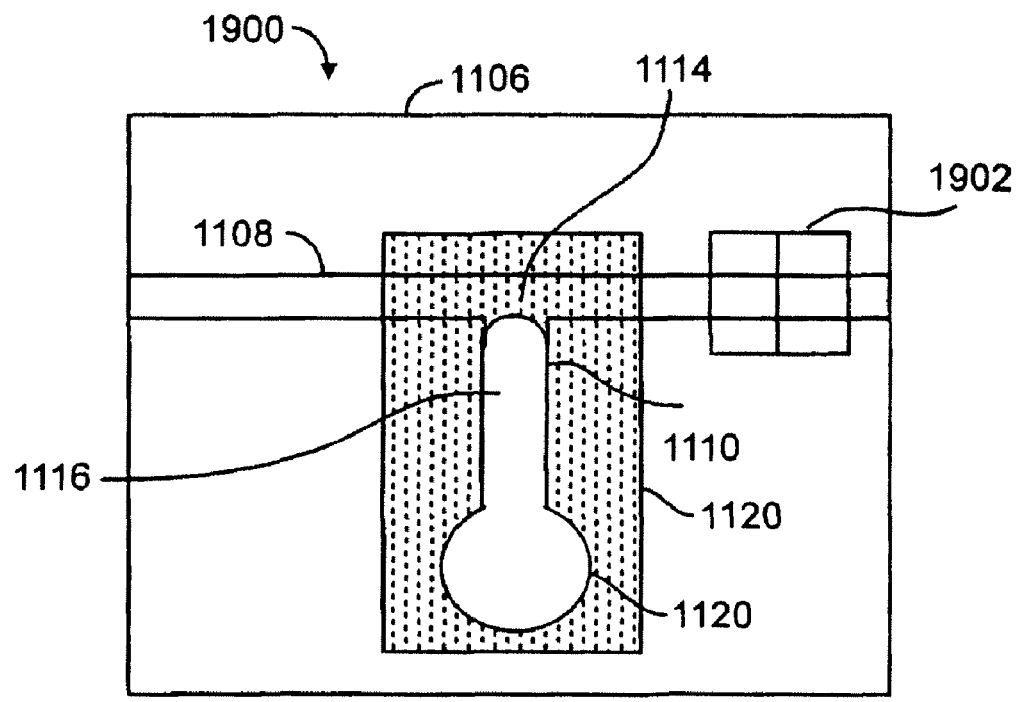
FIGS. 19 and 20 show an example embodiment of a valve apparatus, with a Peltier-actuated valve in series with a bi-stable valve, in its open and closed configurations, respectively.
Figure 20:
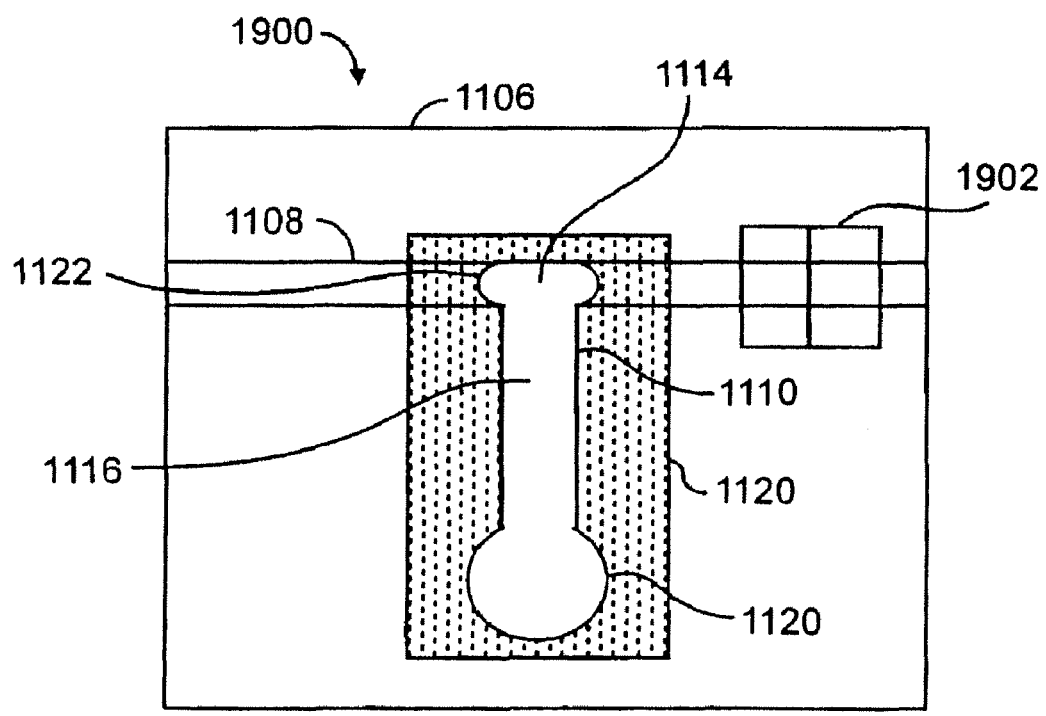

In each of the previously described embodiments, valve switching involves changing the bi-phase material 1116 to the liquid phase, which potentially could get washed downstream in the main flow channel 1108. This can be a problem if there are places downstream in the system where particles of solid bi-phase material 1116 might block small flow channels, or might interfere with a chemical or biological process or analysis. Loss of control fluid is likely if there is any flow through the valve while it is being cycled. In various embodiments, this potential problem is addressed by providing the valve apparatus with a second valve, of another type, in series with the bi-stable valve. This makes it possible to ensure that there is no pressure drop and no flow in the bi-stable valve when it is being cycled. By way of example, and referring to FIG. 19, a valve apparatus 1900 (similar to the valve apparatus 1100) includes a Peltier-actuated valve 1902 in series with the bi-stable valve. In this figure, the bi-stable valve is in the open configuration. To close the bi-stable valve, power is first applied to close the Peltier-actuated valve 1902. This stops all flow in the system. The bi-stable valve is then cycled as described above. After the control fluid has solidified, the Peltier-actuated valve 1902 can be turned off. This reconfigures the valve apparatus 1900 to the closed configuration shown in FIG. 20. The valve apparatus 1900 is stable in the closed position with no power being applied. To reopen the valve apparatus 1900, power is again applied first to close the Peltier-actuated valve 1902. This ensures that there is no pressure drop across the bi-stable valve. The bi-stable valve is then cycled as described above, without concern that there will be a sudden rush of the working fluid that might wash some of the control fluid downstream. After the bi-stable valve has completed cycling and the control fluid is solidified, the Peltier-actuated valve 1902 can be turned off, allowing the fluid to flow. The Peltier-actuated valve 1902 can be combined with any bi-stable valve including but not limited to the embodiments described above.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed:

1. A fluid transport/containment apparatus comprising:
a fluid-bearing module including a substrate and fluid transport/containment elements therein, wherein at least one of the fluid transport/containment elements has a predefined microfluidic dimension; and
an actuation module including actuation elements, the actuation module being detachably secured to the fluid-bearing module such that the actuation elements are operatively interfaced with the fluid transport/containment elements,
the actuation module remaining an integral unit when detached from the fluid-bearing module,
wherein the at least one fluid/transport containment element has a predefined depth of less than 25 microns.

2. A fluid transport/containment apparatus comprising:
a fluid-bearing module including a substrate and fluid transport/containment elements therein, wherein at least one of the fluid transport/containment elements has a predefined microfluidic dimension; and
an actuation module including actuation elements, the actuation module being detachably secured to the fluid-bearing module such that the actuation elements are operatively interfaced with the fluid transport/containment elements,
the actuation module remaining an integral unit when detached from the fluid-bearing module,
further comprising a fluid-impermeable layer disposed between the substrate and the actuation module,
wherein the fluid-impermeable layer comprises stainless steel.

3. A fluid transport/containment apparatus comprising:
a fluid-bearing module including a substrate and fluid transport/containment elements therein, wherein at least one of the fluid transport/containment elements has a predefined microfluidic dimension; and
an actuation module including actuation elements, the actuation module being detachably secured to the fluid-bearing module such that the actuation elements are operatively interfaced with the fluid transport/containment elements,
the actuation module remaining an integral unit when detached from the fluid-bearing module,
wherein the fluid transport/containment elements comprise a main flow channel and a variable volume cell that meet at a junction, at least one of the main flow channel and the variable volume cell having microfluidic dimensions; and wherein the actuation elements comprise a pair of valves positioned adjacent to the main flow channel at opposite sides of the junction, the valves of the pair being selectably controllable to open and close the main flow channel at the opposite sides of the junction, the actuation module including means for changing a volume of the variable volume cell such that, in conjunction with selectively controlling the valves of the pair, a pump is provided.

4. The fluid transport/containment apparatus of claim 3, wherein the valves comprise a Peltier-actuated valve.

5. The fluid transport/containment apparatus of claim 3, wherein the means for changing the volume includes an electromechanical actuation mechanism adjacent to the variable volume cell.

6. The fluid transport/containment apparatus of claim 5, wherein the fluid-bearing module includes a flexible membrane facing the electromechanical actuation mechanism.

7. The fluid transport/containment apparatus of claim 3, wherein the fluid-bearing module includes a flexible membrane enclosing the variable volume cell.

8. The fluid transport/containment apparatus of claim 7, wherein the flexible membrane is spring-loaded.

9. The fluid transport/containment apparatus of claim 6, wherein the electromechanical actuation mechanism includes a plunger member and a drive mechanism.

10. The fluid transport/containment apparatus of claim 3, wherein the means for changing the volume includes an electromagnetic actuation mechanism adjacent to the variable volume cell.

11. The fluid transport/containment apparatus of claim 10, wherein the electromagnetic actuation mechanism includes an electromagnetic coil, and the fluid-bearing module includes a magnet mechanically coupled to the variable volume cell.

12. The fluid transport/containment apparatus of claim 3, wherein the means for changing the volume includes a thermal actuation mechanism adjacent to the variable volume cell.

13. The fluid transport/containment apparatus of claim 12, wherein the thermal actuation mechanism comprises a Peltier heating/cooling element.

14. The fluid transport/containment apparatus of claim 3, wherein the fluid-bearing module includes one or more control fluids within the variable volume cell.

15. The fluid transport/containment apparatus of claim 3, wherein the fluid-bearing module includes one or more bi-phase materials within the variable volume cell.

* * * * *